(12) United States Patent
Imamura

(10) Patent No.: US 6,191,768 B1
(45) Date of Patent: Feb. 20, 2001

(54) MATRIX DISPLAY APPARATUS, MATRIX DISPLAY CONTROL APPARATUS, AND MATRIX DISPLAY DRIVE APPARATUS

(75) Inventor: Yoichi Imamura, Suwa (JP)

(73) Assignee: Seiko Epson Corporation, Tokyo (JP)

( * ) Notice: Under 35 U.S.C. 154(b), the term of this patent shall be extended for 0 days.

(21) Appl. No.: 09/270,928

(22) Filed: Mar. 16, 1999

Related U.S. Application Data

(62) Division of application No. 08/799,327, filed on Feb. 13, 1997, now Pat. No. 5,914,699, which is a continuation of application No. 08/566,314, filed on Dec. 1, 1995, now Pat. No. 5,726,677, which is a continuation of application No. 08/088,142, filed on Jul. 7, 1993, now abandoned.

(30) Foreign Application Priority Data

Jul. 7, 1992 (JP) .................................................. 4-179997
Jun. 24, 1993 (JP) .................................................. 5-152533

(51) Int. Cl.[7] ...................................................... G09G 3/36
(52) U.S. Cl. ........................................... 345/98; 345/204
(58) Field of Search .............................. 345/99, 98, 100, 345/196, 204, 203, 508, 511, 516, 213

(56) References Cited

U.S. PATENT DOCUMENTS

| | | | |
|---|---|---|---|
| 3,603,725 | 9/1971 | Cutler | 348/415 |
| 4,633,441 | 12/1986 | Ishimoto | 365/230.05 |
| 4,672,683 | 6/1987 | Matsueda | 345/173 |
| 4,693,563 | 9/1987 | Harada et al. | 345/97 |
| 4,812,837 | 3/1989 | Shiraishi et al. | 345/204 |
| 4,894,646 | 1/1990 | Ryman | 345/508 |
| 5,093,902 | 3/1992 | Tokumitsu | 345/511 |

(List continued on next page.)

FOREIGN PATENT DOCUMENTS

| | | |
|---|---|---|
| 0206178 | 6/1986 | (EP) . |
| 507061 | 10/1992 | (EP) . |
| 2106689 | 9/1982 | (GB) . |

(List continued on next page.)

OTHER PUBLICATIONS

Old Thinking, New Methods and Television, Wireless, Jan. 1969.

Primary Examiner—Amare Mengistu
(74) Attorney, Agent, or Firm—Mark P. Watson

(57) ABSTRACT

A matrix-type display control device suited to large capacity displays while achieving low power consumption operation is achieved by improving the display data transfer method.

The module controller 100 of a simple matrix-type liquid crystal display comprises a low frequency oscillator 110, timing signal generator 120, standby circuit (display data refresh detection circuit) 130, high frequency oscillator 140, and a direct memory access (DMA circuit) 150. This low frequency oscillator 110 constantly generates the low frequency clock $f_L$. Timing signal generator 120 generates the scan start signal YD required for the LCD module 200, and other signals based on the low frequency clock $f_L$. Standby circuit 130 generates the intermittent operation start control signal $\overline{STE}$ when the display data in VRAM 12 is updated as determined by monitoring the system bus 14a for communications with host MPU 10. The high frequency oscillator 140 generates the high frequency clock $f_H$ phase synchronized to the low frequency clock $f_L$ during the intermittent operation start control signal $\overline{ST}$ apply period. The DMA circuit 150 reads the display data from the VRAM 12 over dedicated bus 14b by direct memory access, and transfers the display data over data bus 17 to the frame memories 252-1~252-N of X drivers 250-1~250-N during the intermittent operation start control signal $\overline{ST}$ apply time using the high frequency clock $f_H$.

43 Claims, 13 Drawing Sheets

U.S. PATENT DOCUMENTS

| | | | |
|---|---|---|---|
| 5,172,107 | 12/1992 | Kanno et al. | 345/100 |
| 5,287,485 | 2/1994 | Umina et al. | 395/425 |
| 5,396,597 | 3/1995 | Bodin et al. | 345/511 |
| 5,406,304 | 4/1995 | Shiragyama | 345/196 |
| 5,412,397 | 5/1995 | Kanatani et al. | 345/100 |
| 5,412,777 | 5/1995 | Wakimoto | 345/203 |
| 5,583,985 | 12/1996 | Kohiyama et al. | 395/507 |
| 5,623,624 | 4/1997 | Holland et al. | 395/432 |
| 5,655,114 | 8/1997 | Taniai et al. | 395/580 |

FOREIGN PATENT DOCUMENTS

| | | |
|---|---|---|
| 2249855 | 11/1990 | (GB) . |
| 2179185 | 8/1996 | (GB) . |
| 18501 | 9/1993 | (WO) . |

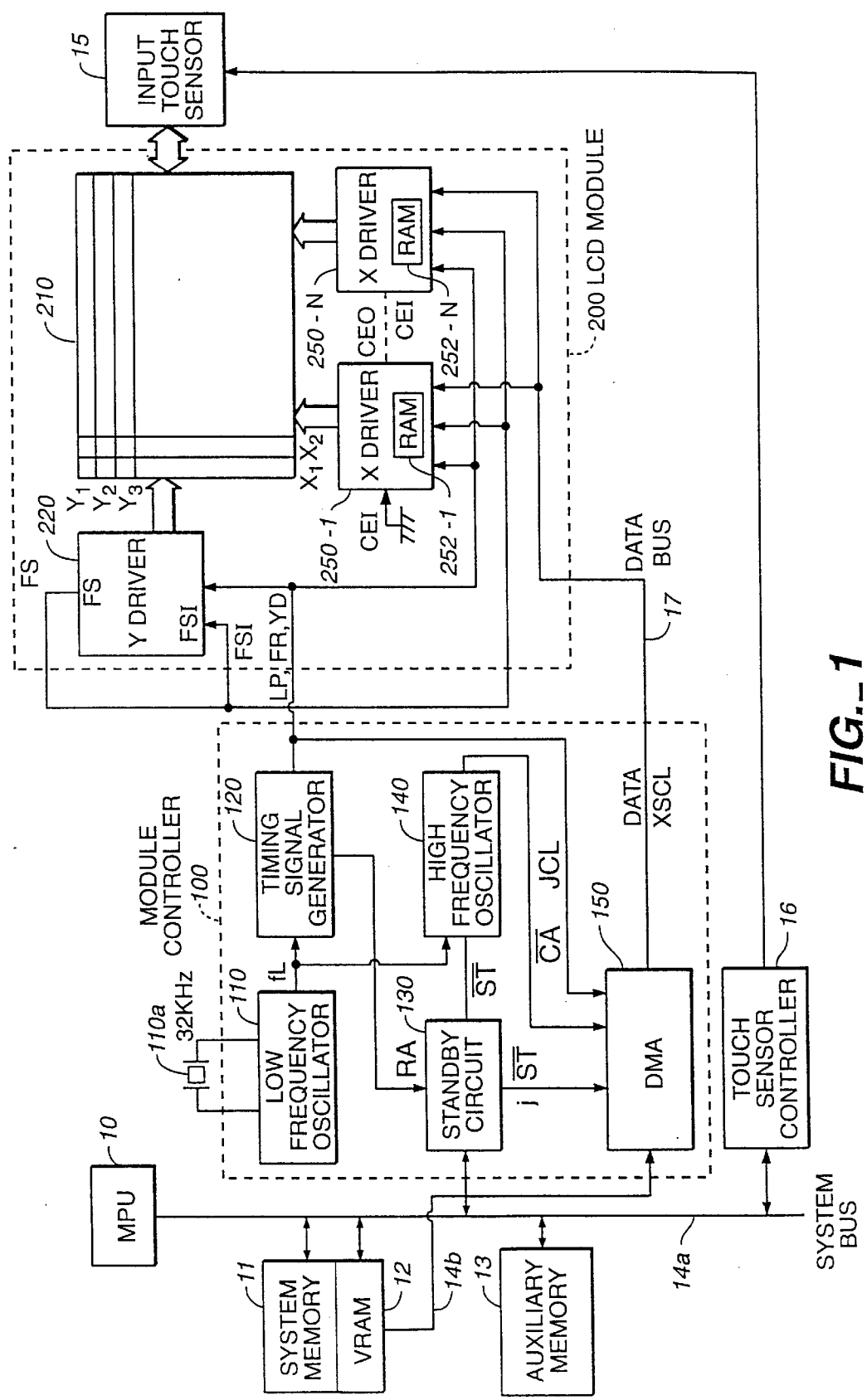
FIG._1

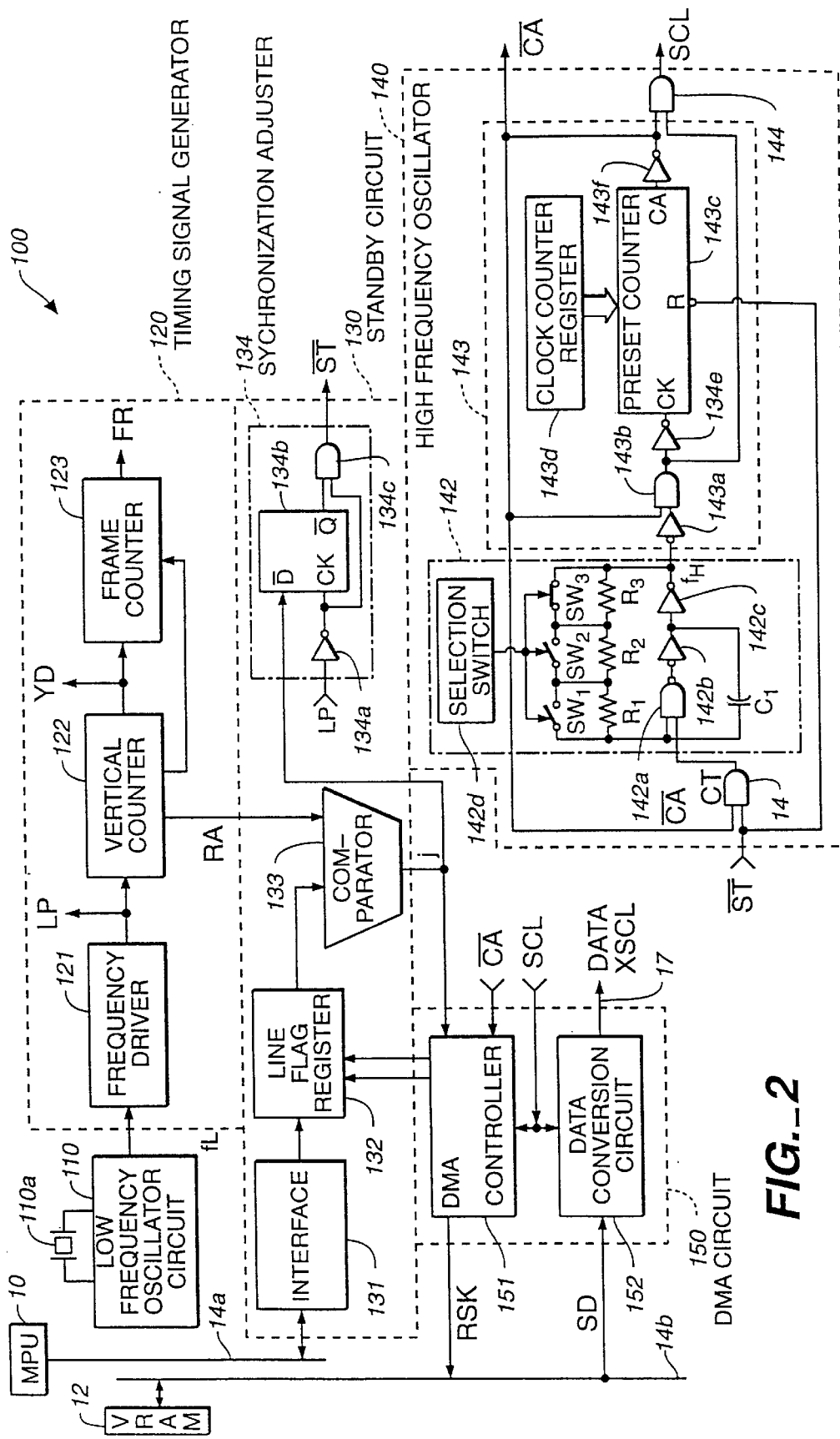
FIG._2

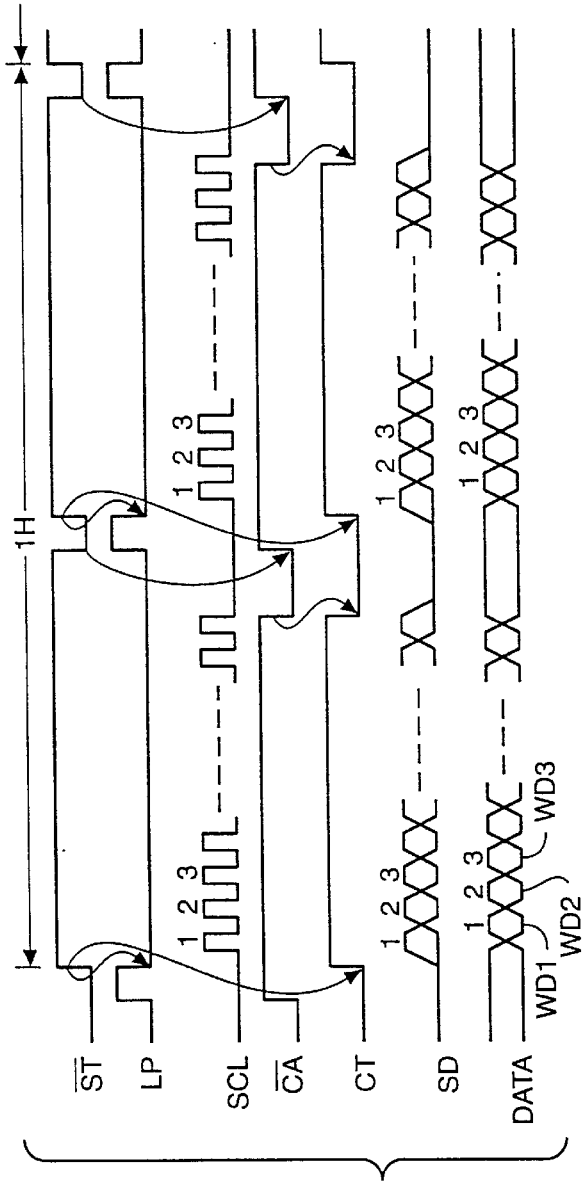
FIG._3
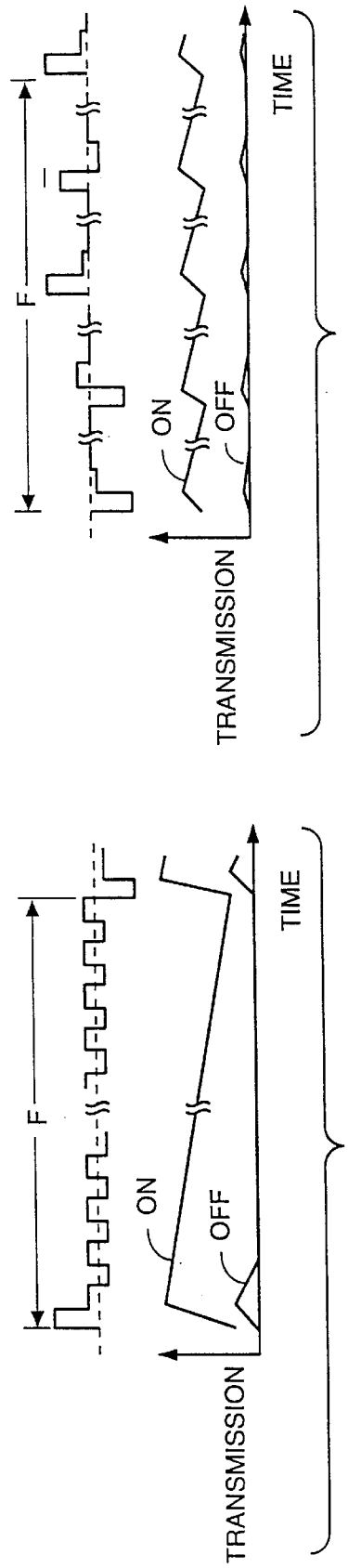
FIG._8
FIG._6

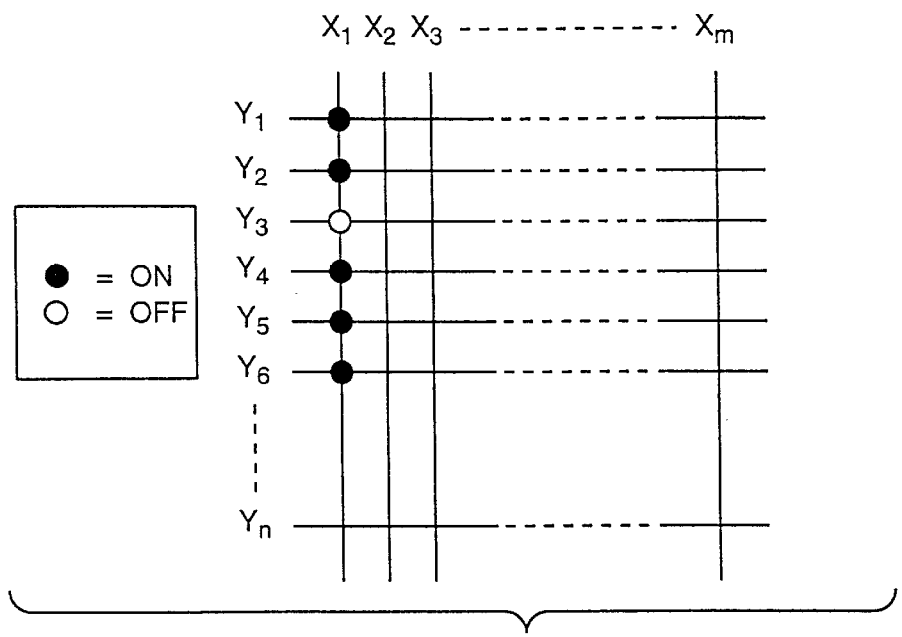
FIG._4
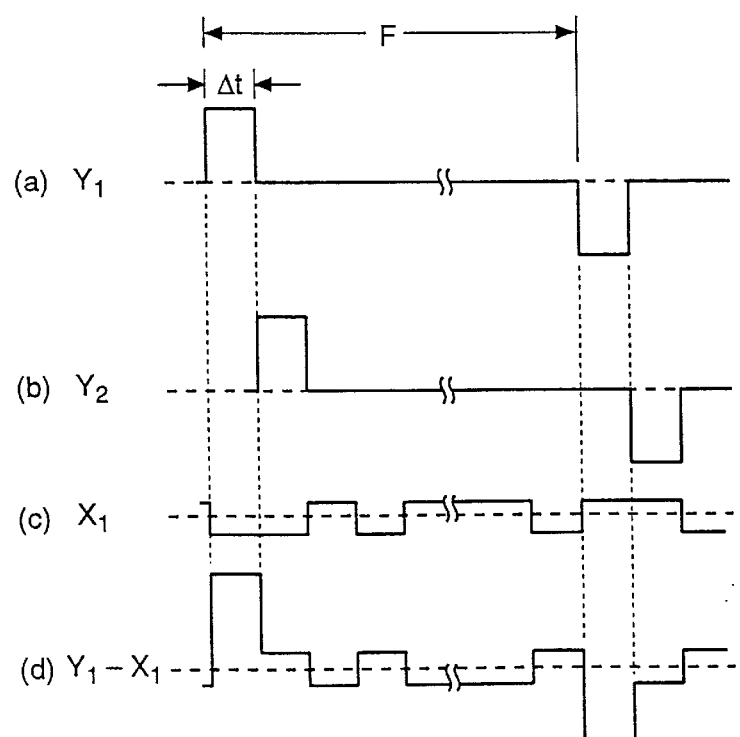
FIG._5

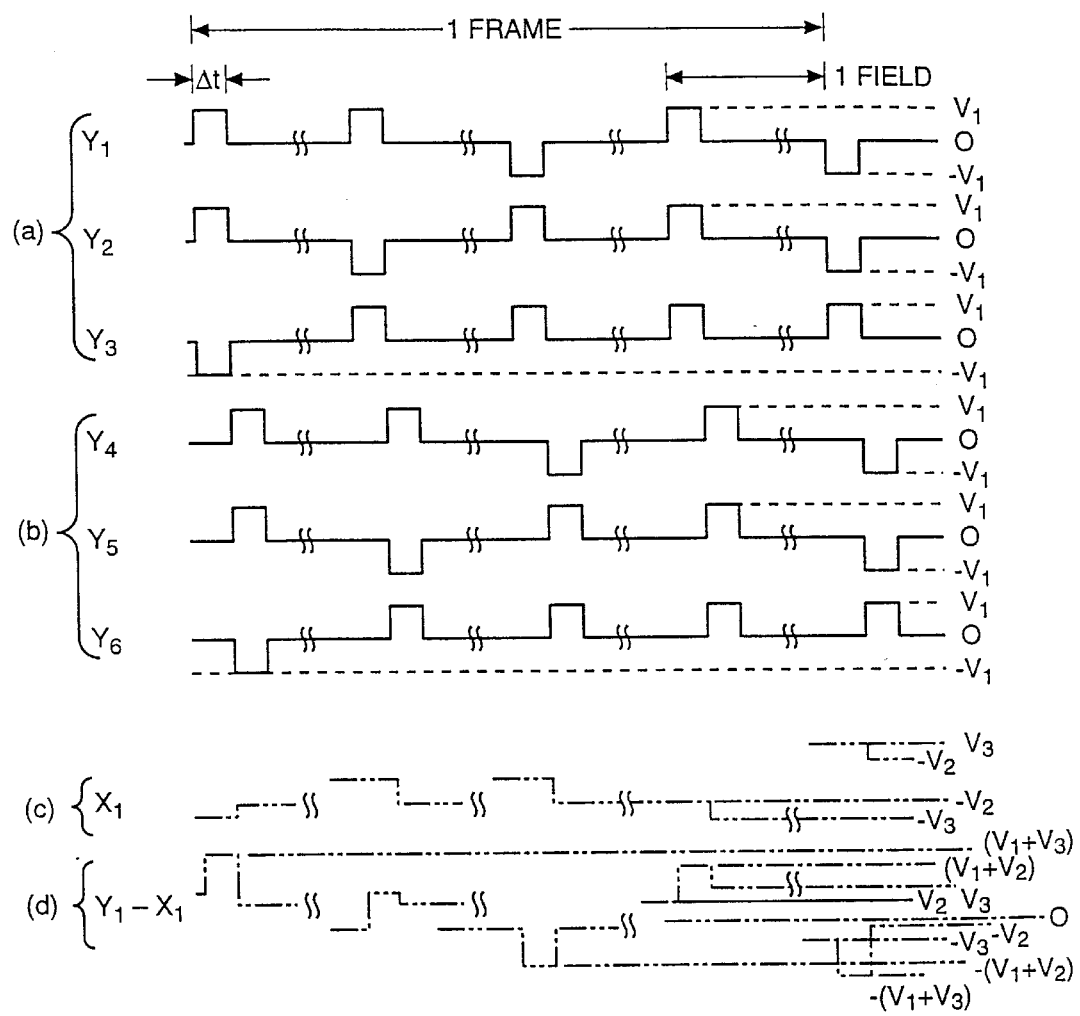
FIG._7

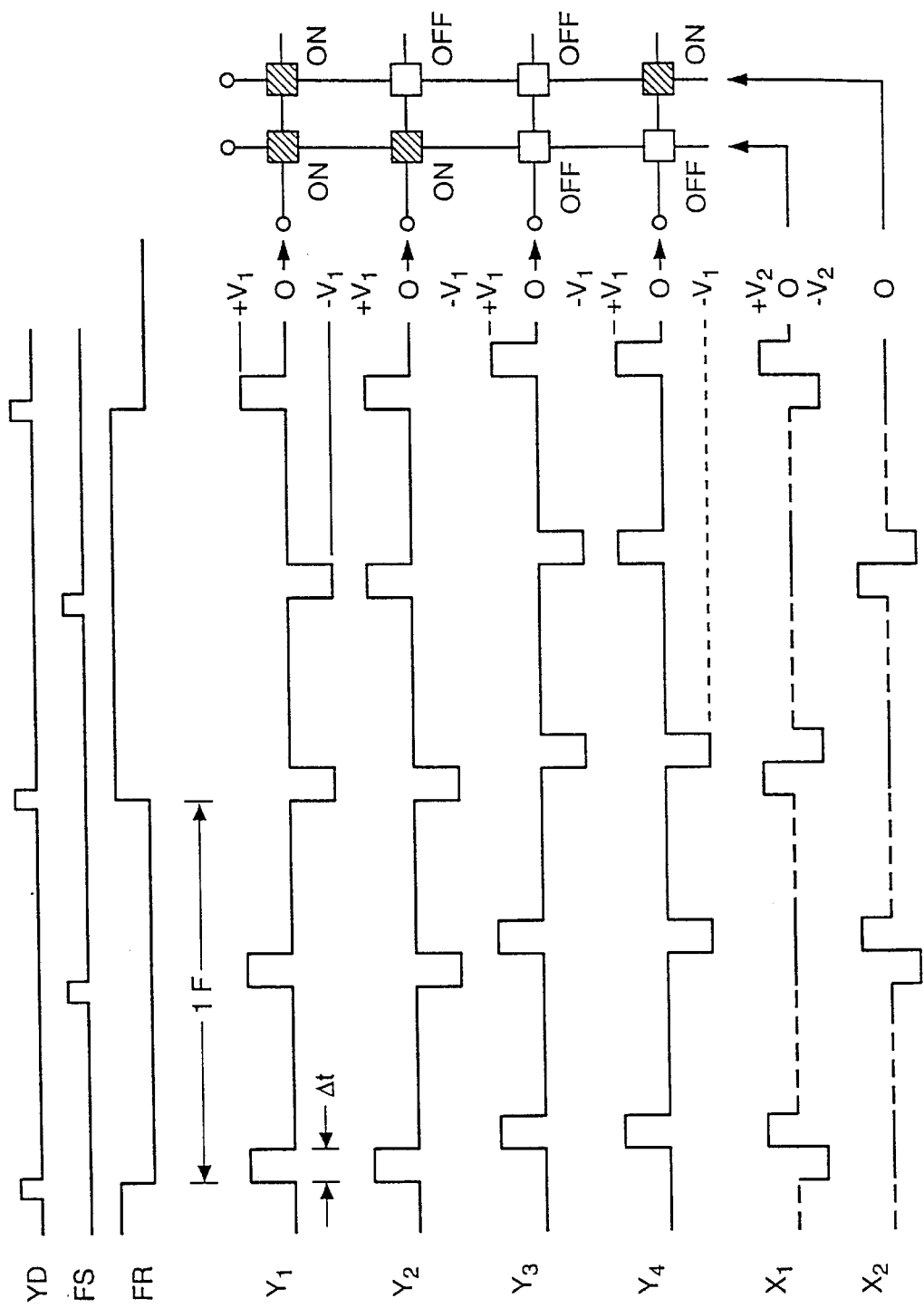
FIG._9

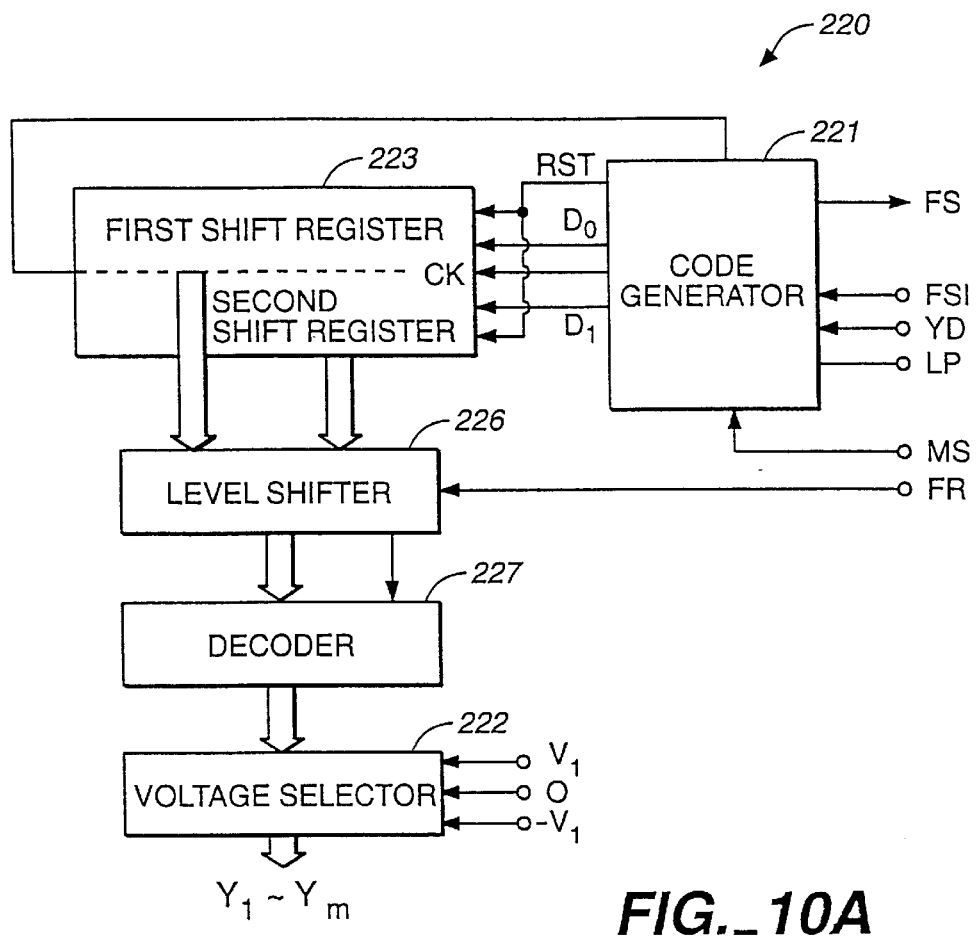
FIG._10A
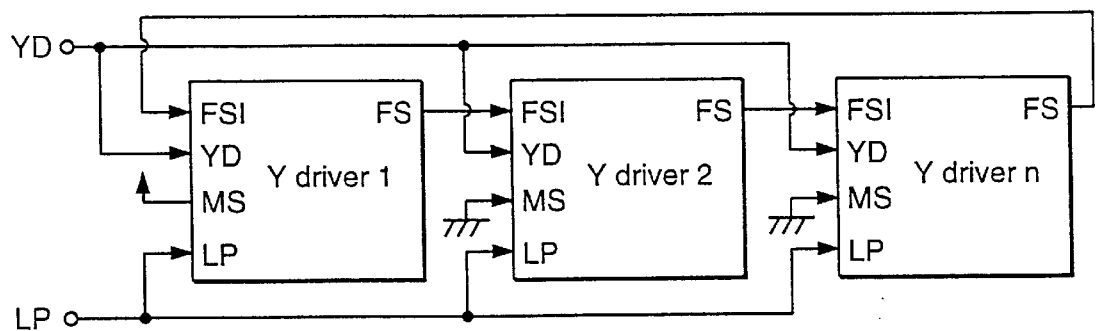
FIG._10B

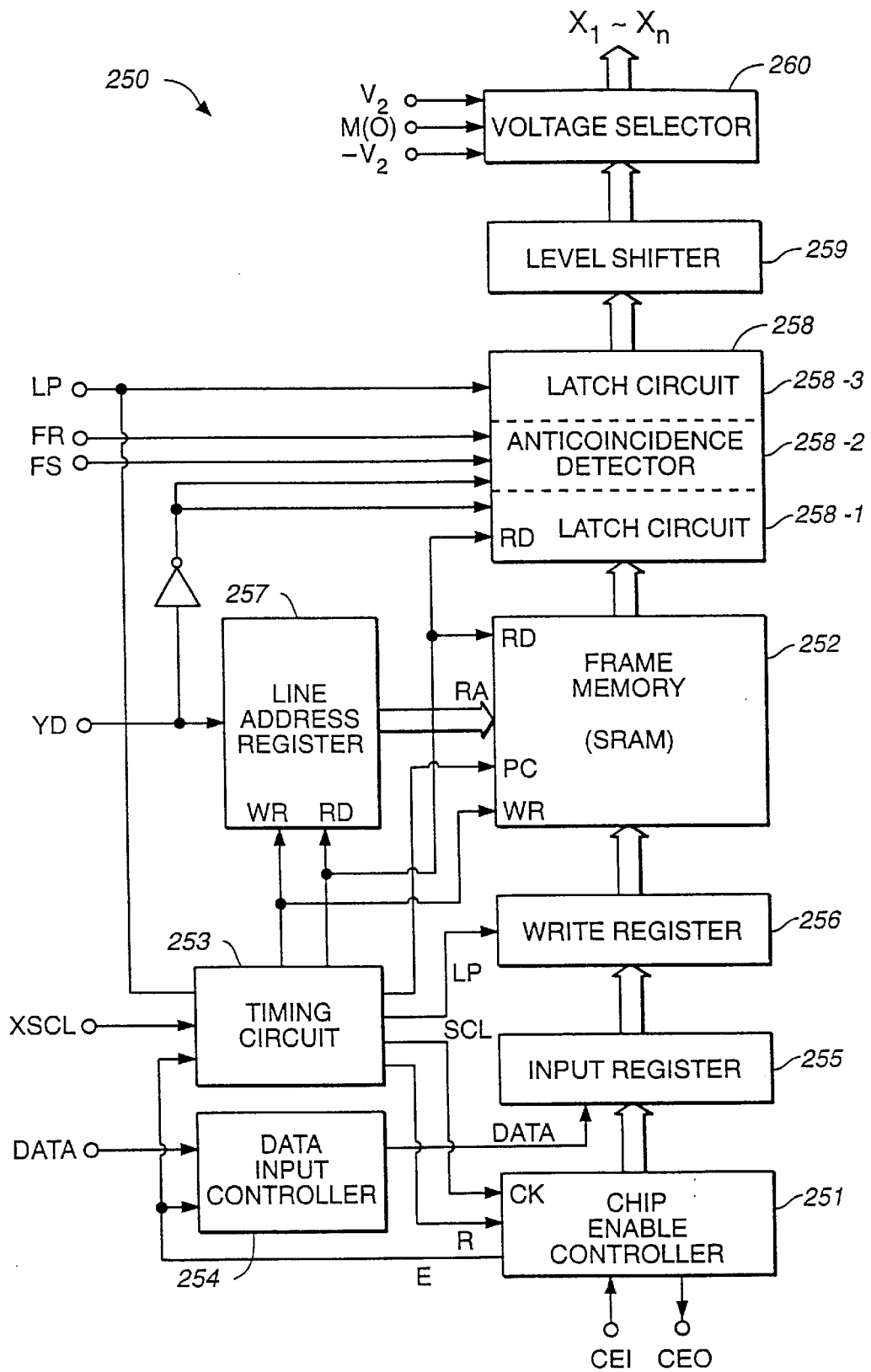
FIG._11

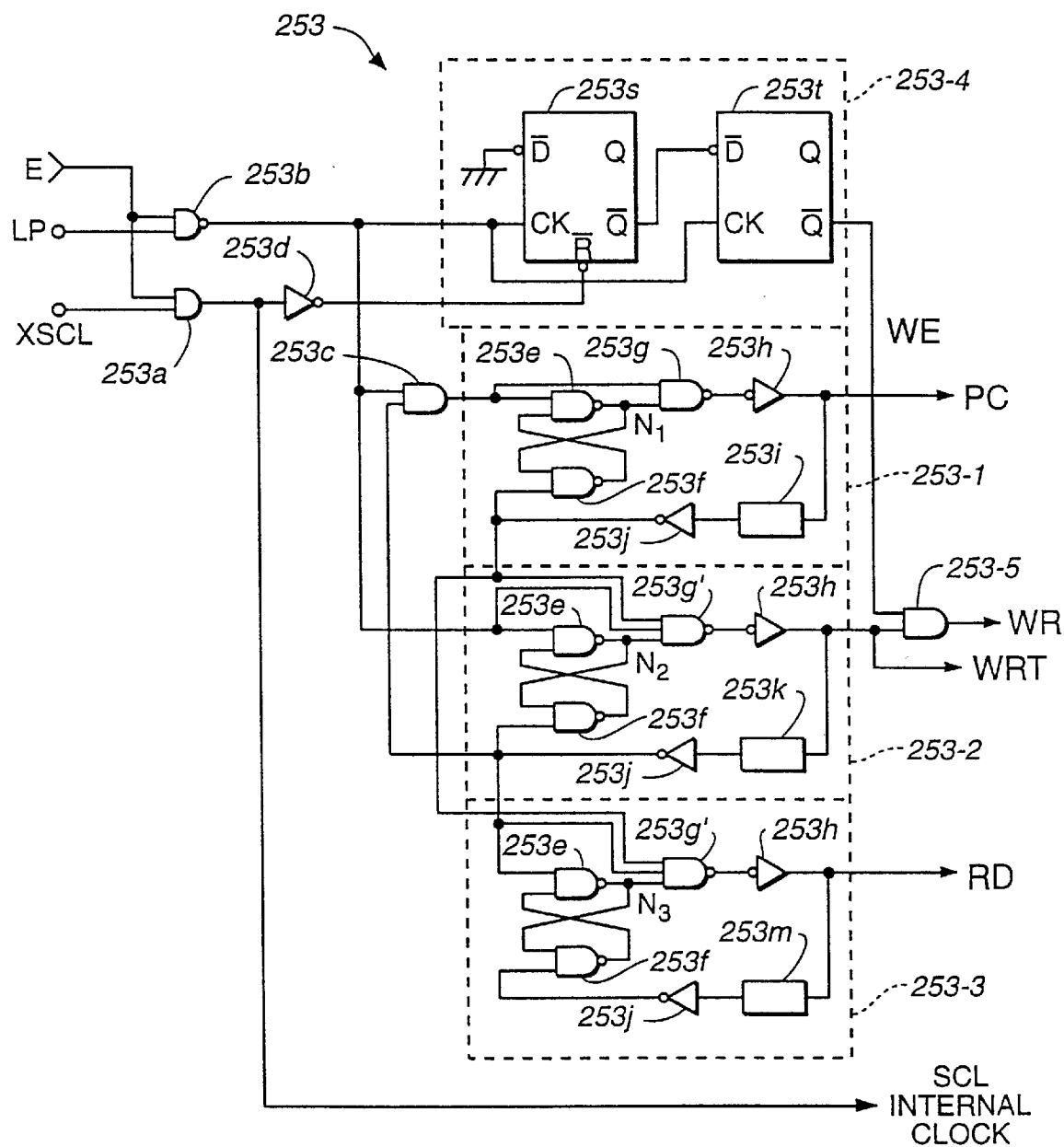
FIG._12

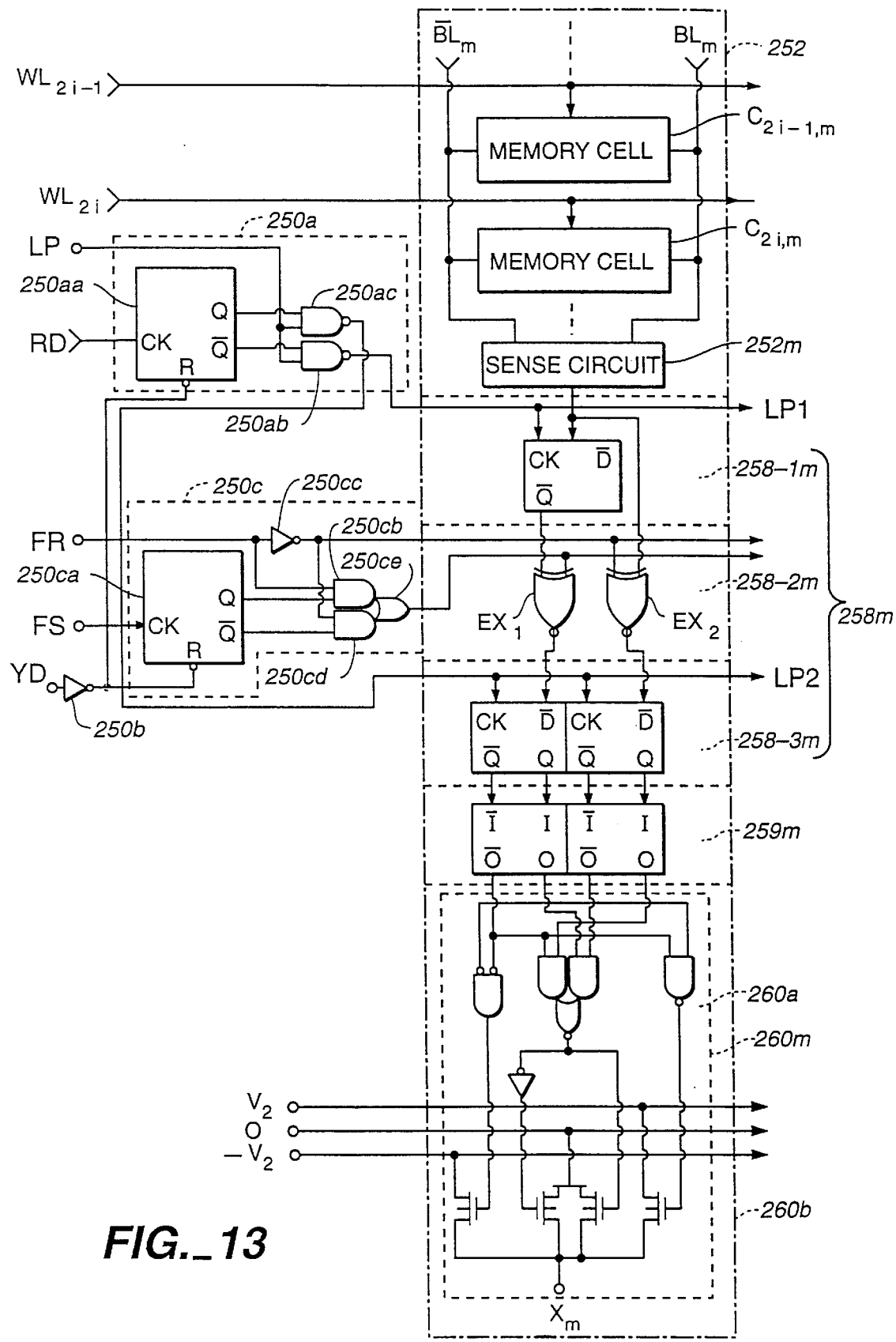
FIG._13

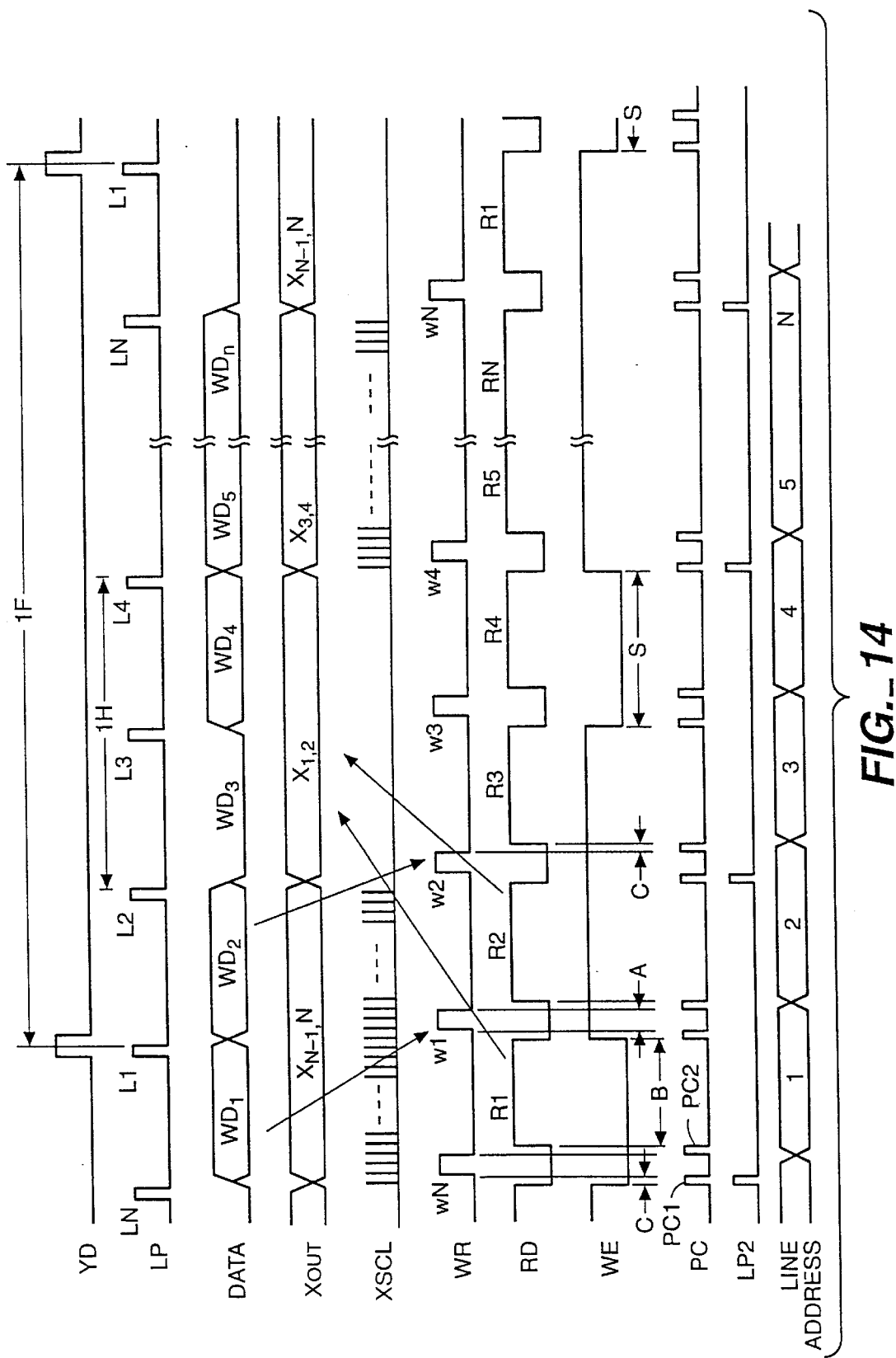
FIG._14

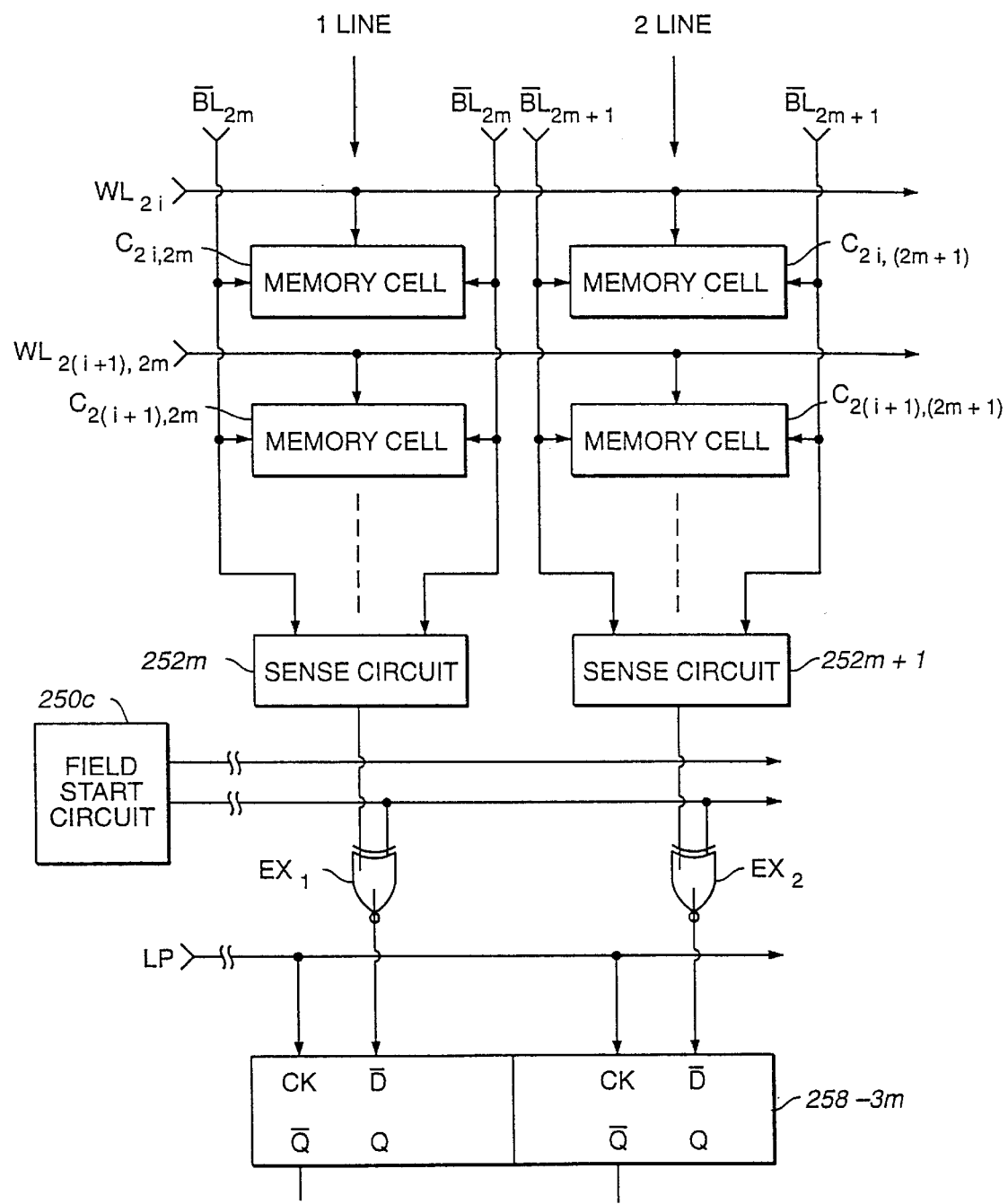
FIG._15

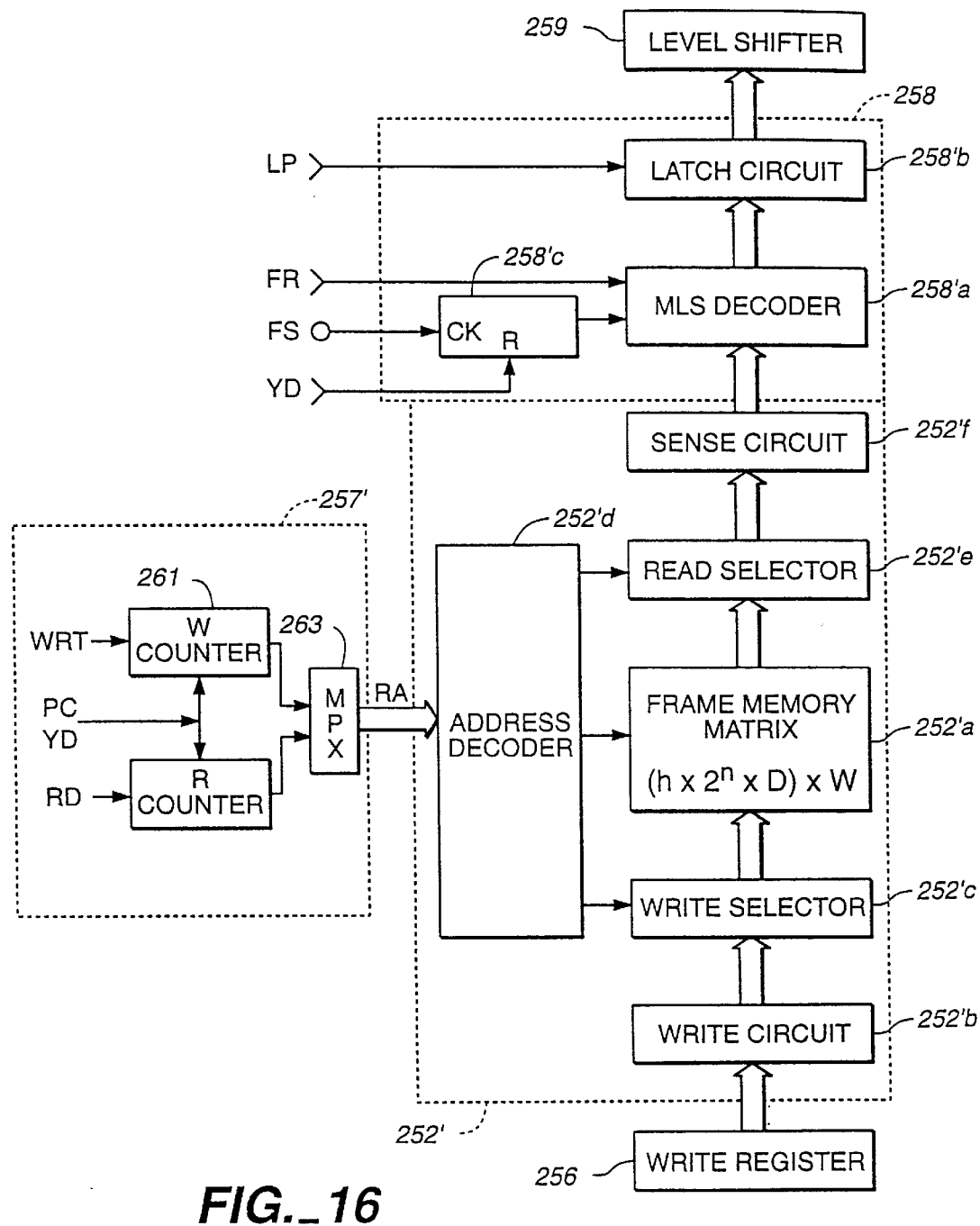
FIG._16

MATRIX DISPLAY APPARATUS, MATRIX DISPLAY CONTROL APPARATUS, AND MATRIX DISPLAY DRIVE APPARATUS

CONTINUING APPLICATION DATA

This application is a divisional of U.S. patent application Ser. No. 08/799,327, filed Feb. 13, 1997 now U.S. Pat. No. 5,914,699, which is a continuation of Ser. No. 08/566,314, filed Dec. 1, 1995, issued as U.S. Pat. No. 5,726,677, which is a continuation of Ser. No. 08/088,142, filed Jul. 7, 1993, now abandoned, each of which is incorporated herein in its entirety by reference.

BACKGROUND OF THE INVENTION

1. Field of the invention

The present invention relates to a liquid crystal display or other matrix-type display apparatus suited to using a multiple line selection drive method, and relates specifically to an improvement of primarily the matrix-type display element module, controller, and signal electrode driver circuit.

2. Related art

In a simple matrix-type liquid crystal display commonly used for flat panel display devices, the display data from a microprocessor unit (MPU) is typically transferred to the LCD module (the liquid crystal display panel (LCD panel)), the scan electrode drive circuit (Y driver), and the signal electrode drive circuit (X driver) using one of two basic methods: using a matrix-type liquid crystal display element module controller (simply "module controller" below), or using an X driver embedded in RAM.

The module controller method is described first. As with a CRT display apparatus, the module controller connected to the system bus reads the display data from video RAM (VRAM), and sends the data to the LCD module at a high frequency to refresh the display.

In the latter method, a dual port frame memory (built-in RAM) is provided in the X driver. This frame memory is directly accessed by the MPU via the data bus, control bus, or address bus irrespective of the LCD timing to generate the required control signal in the X driver by changing the display data in the frame memory. One scan line equivalent of display data is simultaneously read from the built-in frame memory to refresh the display.

With the module controller method above, VRAM data access and transfer coordinated with the LCD timing must be executed each time the display screen is changed, and it is therefore necessary for the VRAM, module controller, and LCD driver to constantly operate at a high frequency. In addition, the display refresh operation involves operation of the VRAM, module controller, and LCD driver. Operation of an LSI device at a high frequency clock results in through-current flowing to the plural CMOS devices used as circuit elements, increasing the total current consumption. Total current consumption also increases in direct proportion to the size of the LCD panel. In addition, while the VRAM is accessed by both the MPU and the module controller, a high speed clock must be used so that MPU access during the display refresh operation does not collide with module controller access, thus limiting the use of a low frequency operating module controller and limiting the processing ability of the MPU.

Operation at a low frequency clock is possible in the latter method above because there is no relationship between display data transfer and LCD timing. This method thus requires 10–100 times less power than the module controller method. When using a large liquid crystal panel, however, the number of X drivers must be increased.

The number of X driver output terminals is generally a multiple of ten (e.g., 160 pins) and not a power of two (e.g., $2^n$), however, because each RAM device built in to the X drivers has an independent address area. When the internal memory of plural X drivers is addressed by the MPU, the MPU finds apparent gaps in the total memory area, and it is usually difficult to maintain a continuous sequence of addresses. As a result, the address coordination process of the MPU must be executed at high speed when the entire display area is changed at one time as during scrolling or panning operations, significantly increasing the processing load on the MPU.

It is, of course, possible to design the X driver ICs to have an exponent-of-two number of output pins, but this would seriously impair system interchangeability because compatibility with the number of electrodes in existing LCD panels would be lost. In addition, use of plural X drivers necessarily increases the number of chip selection buses, and sufficient space for this plural number of X drivers to be installed around the LCD panel must be provided. This reduces the display area ratio of the display panel, and inhibits the potential size reduction of the LCD module. The latter method above is therefore unsuited to large scale liquid crystal panels.

SUMMARY OF THE INVENTION

Therefore, an object of the present invention is to provide a matrix display apparatus, a matrix display control apparatus, and a matrix display drive apparatus suited to a low power consumption, large capacity display by improving the display data transfer method.

The present invention provides a method combining a module controller-type display device with a signal electrode (X) driver having a built-in frame memory that intermittently operates the oscillation source of a high frequency clock for the module controller during display data transfer.

Specifically, a matrix display apparatus according to the invention comprises a matrix display device of display elements arranged in a matrix pattern, a first random access memory device for storing the display data, a second random access memory device for storing the display data of at least part of the display elements, and a signal electrode drive means for reading the display data from the second memory device to apply a drive voltage to the signal electrodes of the matrix display device. This matrix display apparatus is characterized by an intermittent high frequency oscillator that oscillates according to changes in the display data stored in the first RAM device, and a display data transfer means for reading the display data associated with the change from the first RAM device according to the high frequency clock output from the intermittent high frequency oscillator, and transferring the read display data together with the high frequency clock to the second RAM device.

The matrix display control apparatus for this display apparatus comprises a low frequency oscillator for constantly generating a low frequency clock, a timing signal generator for generating a specified timing signal based on the low frequency clock from the low frequency oscillator, a display data refresh detection means for generating an intermittent control signal based on changes in the display data stored in the first RAM device, an intermittent high frequency oscillator that oscillates according to the intermittent control signal, and a display data transfer means for reading the display data associated with the change from the first RAM device according to the high frequency clock output from the intermittent high frequency oscillator, and transferring the read display data together with the high frequency clock to the second RAM device.

A matrix display drive apparatus comprising a second random access memory device for storing the display data of at least part of the display elements, reading the display data from the second RAM device, and applying a drive voltage to the signal electrodes of the matrix display device, and used in a display apparatus using this matrix display control apparatus comprises a timing signal generator for generating a write control signal and a read control signal at an offset timing within one scanning period based on the cycle signal received each scanning period, and a read/write means for executing a read operation according to the read control signal and then executing a write operation according to the write control signal with both operations addressing the same address in the second RAM device.

A matrix display drive apparatus of this type preferably comprises a clock detection means for detecting when the high frequency clock used for display data transfer stops, and a write prohibit control means for preventing generation of the write control signal based on this detection signal.

The read/write means of this matrix display drive apparatus comprises a temporary storage means for sequentially storing at least one scan line of the incoming display data using the high frequency clock, and a buffer for writing to the second RAM device the stored display data from the temporary storage means according to a signal longer than one cycle of the high frequency clock.

In a matrix display drive apparatus using a multiple line selection drive method, the read/write means comprises a signal voltage state assignment means for extracting the signal voltage to be applied to the signal electrode from the display data read from the second RAM device and the voltage state of the scanning electrode of the matrix display device.

This signal voltage state assignment means specifically comprises a means for reading plural scan lines of display data from the second RAM device on a time-share basis, a temporary storage means that alternately waits for the read display data, a scan state setting means for specifying the voltage state of the scan electrode of the matrix display device, an anti-coincidence detector for detecting anti-coincidence between the plural scan line equivalent display data and the selected voltage state of the scan electrode, and a voltage selector for selecting the signal electrode voltage based on the anti-coincidence detection result.

In a differently configured matrix display drive apparatus using a multiple line selection drive method, the second RAM device comprises a memory array for storing plural scan lines of display data for one line address of the matrix display device, and the signal voltage state assignment means comprises a means for batch reading plural scan lines of display data, a scan state setting means for specifying the voltage state of the scan electrode of the matrix display device, and a voltage selector for selecting the drive voltage from the plural scan line display data read from the second RAM device and the selected voltage state of the scan electrode.

The present invention configured for a uniform distribution, multiple line selection drive method for a scan electrode drive apparatus using a multiple line selection drive method is characterized by a means for simultaneously selecting and cyclically scanning plural scan electrodes plural times within the period of the frame start signal.

A matrix display control apparatus thus comprised can reduce the total power consumption because of intermittent operation of the high frequency clock because the high frequency clock operates only when there is a change in the display data stored in the first RAM device, at which time the display data is transferred to the second RAM device. The processing load on the host MPU for the first RAM device can also be reduced because the transfer process to the second RAM device is executed not by the MPU but by an intermediary matrix display control apparatus. By cascade connecting the drive device of the signal electrodes, display data can be transferred according to the configuration of the matrix display device without being aware of the driver side memory configuration, and the address correlation process can be simplified. The display can also be refreshed faster because the display data for each scan line is stored in the second RAM device. By cascade connecting the signal electrode drive devices, the number of connections (e.g., the number of chip selection buses) between the matrix display control apparatus and drive devices can be minimized even in large capacity displays, and display devices with a large display area ratio can be achieved.

In addition, the second RAM device can be accessed with ease using time-share access timing during one scanning period. Greater tolerance is therefore achieved in the second RAM device access timing, improving data writing performance and making it possible to reduce the size of the transistors in the second RAM device. This also contributes to a reduction in driver chip size.

Other objects, advantages and attainments together with a fuller understanding of the invention will become apparent and appreciated by referring to the following description and claims taken in conjunction with the accompanying drawings.

BRIEF DESCRIPTION OF THE DRAWINGS

FIG. 1 is a block diagram of the overall configuration of a simple matrix-type liquid crystal display apparatus according to the preferred embodiment of the present invention.

FIG. 2 is a detailed block diagram of the module controller in a simple matrix-type liquid crystal display apparatus according to the present embodiment.

FIG. 3 is a timing chart used to describe the operation of the above module controller.

FIG. 4 is an illustration of sample pixel on/off states in a simple matrix-type liquid crystal display apparatus.

FIG. 5 is a wave form diagram of the scan electrode wave and signal electrode wave in a multiplex drive method using voltage averaging.

FIG. 6 is a wave form diagram of the on/off characteristics of the liquid crystal pixels in a multiplex drive method using voltage averaging.

FIGS. 7(a)–(d) are a wave form diagrams of the scan electrode wave and signal electrode wave in a uniform distribution, 3-line selection drive method.

FIG. 8 is a wave form diagram of the on/off characteristics of the liquid crystal pixels in the uniform distribution, 3-line selection drive method shown in FIG. 7.

FIG. 9 is a wave form diagram of the scan electrode wave and signal electrode wave in the distributed 2-line selection drive method used in the present embodiment.

FIG. 10A is a block diagram of the scan electrode drive circuit (Y driver) in a simple matrix-type liquid crystal display apparatus according to the present embodiment, and FIG. 10B is a block diagram of plural Y drivers cascade connected.

FIG. 11 is a block diagram of the signal electrode drive circuit (X driver) in a simple matrix-type liquid crystal display apparatus according to the present embodiment.

FIG. 12 is a detailed block diagram of the timing circuit in the signal electrode driver (X driver).

FIG. 13 is a block diagram of the peripheral circuits, signal pulse assignment circuit, level shifter, and voltage selector in the signal electrode driver (X driver), which are described by focusing on the m-bit circuit 250*m* for one signal electrode (one output $X_m$).

FIG. 14 is a timing chart used to describe the write operation and read operation in the signal electrode driver.

FIG. 15 is a block diagram of an alternative frame memory for the signal electrode driver.

FIG. 16 is a block diagram of the signal electrode driver using the alternative frame memory shown in FIG. 15.

A list of reference numerals is provided in Appendix I.

DETAILED DESCRIPTION OF THE INVENTION

Description of Overall Configuration

As shown in FIG. 1, this simple matrix-type LCD comprises a programmed host MPU 10, system memory 11 used as the working memory of host MPU 10, video RAM (VRAM) 12 for storing the display data at the same address area as system memory 11, auxiliary memory 13 for storing images, data, and audio information, module controller 100 connected to system bus 14*a* and dedicated bus 14*b*, LCD module 200 display-controlled by module controller 100, input touch sensor 15, and touch sensor controller 16.

As in a conventional computer system, communications control devices and other peripheral devices such as other display devices can be connected to system bus 14*a* as required.

LCD module 200 further comprises a simple matrix-type liquid crystal display (LCD panel) 210, scan electrode drive circuit (Y driver IC) 220 for selecting plural scan electrodes $Y_1, Y_2 \ldots Y_n$ of LCD panel 210, and signal electrode drive circuits (X driver ICs) 250-1~250-N with N built-in frame memory (RAM) devices for supplying the display data to plural signal electrodes of LCD panel 210.

Module controller

Module controller 100 comprises a low frequency oscillator 110, timing signal generator 120, standby circuit (display data refresh detection circuit) 130, high frequency oscillator 140, and a direct memory access (DMA) circuit 150. Low frequency oscillator 110 comprises a 32~512 kHz oscillator, and constantly generates a low frequency clock $f_L$. Based on low frequency clock $f_L$, timing signal generator 120 generates the scan start signal (frame start pulse) YD required for LCD module 200, the line latch signal (latch pulse) LP for series-parallel conversion of the transferred display data, and the liquid crystal current alternating signal FR. Standby circuit 130 generates the intermittent operation start control signal $\overline{ST}$ when the intermittent operation command is received directly from host MPU 10, or when the display data in VRAM 12 is updated as determined by monitoring system bus 14*a* for communications with host MPU 10. High frequency oscillator 140 generates the high frequency clock $f_H$ phase synchronized to the low frequency clock $f_L$ during the intermittent operation start control signal $\overline{ST}$ apply period. DMA circuit 150 reads the display data from VRAM 12 over dedicated bus 14*b* by direct memory access, converts the display data to the bit number or format of data bus 17, and transfers the display data over data bus 17 to frame memories 252-1~252-N of X drivers 250-1~250-N during the intermittent operation start control signal $\overline{ST}$ apply time using the high frequency clock $f_H$.

As shown in FIG. 2, timing signal generator 120 comprises a frequency divider 121, vertical counter 122, and frame counter 123. Frequency divider 121 generates two line latch signals LP during one horizontal period based on the low frequency clock $f_L$. Vertical counter 122 counts the line latch signals LP to generate the line address signal RA specifying the number of the scan electrode (line address) and frame start pulse YD. Frame counter 123 generates the liquid crystal current alternating signal FR based on frame start pulse YD and a specified count from vertical counter 122.

Standby circuit 130 comprises a system bus interface circuit 131, line flag register 132, comparator 133, and synchronization adjuster 134. The line flag register 132 stores the transfer command flag, which is set by host MPU 10, when host MPU 10 changes the display data in the X driver frame memory of VRAM 12. Comparator 133 evaluates the coincidence/anti-coincidence of the line address signal RA and the address of the scan electrode for which the transfer command flag is set to generate the coincidence signal j. Synchronization adjuster 134 generates the intermittent operation start control signal $\overline{ST}$ from the coincidence signal j and the latch pulse LP. It is to be noted that two intermittent operation start control signals $\overline{ST}$ are generated during one horizontal period (1 H) of the latch pulse LP because of the use of a 2-line selection/drive method.

Synchronization adjuster 134 comprises an inverter 134*a* for inverting the latch pulse LP, a D flip-flop 134*b* for generating a coincidence signal synchronized to the latch pulse LP drop, and AND gate 134*c* setting the pulse width of the synchronization coincidence signal as the intermittent operation start control signal $\overline{ST}$ limited to the latch pulse LP period. The read start address of VRAM 12 is set by host MPU 10.

High frequency oscillator 140 comprises AND gate 141, high variable frequency CR oscillator 142, intermittent operation time limiter 143, and AND gate 144. AND gate 141 generates the oscillation control signal CT from the intermittent operation start control signal $\overline{ST}$ and intermittent operation end control signal $\overline{CA}$, which is described below. High variable frequency CR oscillator 142 oscillates intermittently as controlled by the oscillation control signal CT. Intermittent operation time limiter 143 counts the high frequency clock $f_H$ obtained by high variable frequency CR oscillator 142 to generate the intermittent operation end control signal $\overline{CA}$ limiting the intermittent operation time. AND gate 144 generates the shift clock SCL for storing the display data in the shift register from the high frequency clock $f_H$ and intermittent operation end control signal $\overline{CA}$.

High variable frequency CR oscillator 142 comprises a CR oscillator formed by AND gate 142*a*, inverters 142*b* and 142*c*, feedback resistors $R_1$, $R_2$, and $R_3$, and feedback capacitor $C_1$, resistance selectors $SW_1$, $SW_2$, and $SW_3$, and switch selection register 142*d*. The time constant of switch selection register 142*d* is set by host MPU 10, which controls the combination of open and closed resistance selectors $SW_1$, $SW_2$, and $SW_3$ accordingly. Because the feedback resistance (time constant) applied to the CR oscillator is controlled by changing the combination of open and closed resistance selectors $SW_1$, $SW_2$, and $SW_3$ based on the content of switch selection register 142d, the value of the oscillation frequency $f_H$ of the CR oscillator can be changed.

Intermittent operation time limiter 143 comprises inverter 143a, AND gate 143b, preset counter 143c, variable clock count register 143d, and inverter 143f. Inverter 143a inverts and buffers the high frequency clock $f_H$. AND gate 143b passes the high frequency clock $f_H$ only during the HIGH level period of the intermittent operation end control signal $\overline{CA}$. Preset counter 143c resets at the signal drop of the intermittent operation start control signal $\overline{ST}$ using as a clock the high frequency clock $f_H$ input from AND gate 143b through inverter 143e. Clock count register 143d stores the number of high speed clocks SCL (XSCL) required to transfer one scan line of display data. This number is set by host MPU 10. Inverter 143f inverts the carrier output CA of preset counter 143c to generate the intermittent operation end control signal $\overline{CA}$.

DMA circuit 150 comprises DMA controller 151 and data conversion circuit 152. DMA controller 151 outputs the read clock RSK to dedicated bus 14b using the shift clock SCL based on the coincidence signal j from standby circuit 130, and outputs the flag address signal and flag preset signal to line flag register 132. Data conversion circuit 152 fetches the display data from the overwrite address in VRAM 12 at the read clock RSK over dedicated bus 14b as read data SD, obtains display data DATA by converting the read data SD using the shift clock SCL to the bit number or format of data bus 17, and sends the display data DATA with shift clock XSCK, the frequency of which is equal to the frequency of shift clock SCL, over data bus 17 to X drivers 250-1~250-N.

The operation of module controller 100 is described with reference to FIG. 3. Low frequency oscillator 110 and timing signal generator 120 in the module controller 100 are normally operating, but it is not necessary for high frequency oscillator 140 to operate constantly because frame memories 252-1~252-N storing the input display data DATA are built in to X drivers 250-1~250-N. High frequency oscillator 140 therefore operates intermittently, operating only when the display data in VRAM 12 is updated.

Low frequency oscillator 110 constantly outputs the low frequency clock $f_L$, and frequency divider 121 of timing signal generator 120 frequency divides the low frequency clock $f_L$ at the specified ratio to generate the latch pulse LP. The latch pulse LP is emitted twice per one horizontal period (1 H) at a maximum frequency of 32 kHz~80 kHz for a 640×480 pixel monochrome display. Vertical counter 122 counts the latch pulses LP to generate the line address signal RA and frame start pulse YD, and frame counter 123 counts frame start pulse YD to generate the liquid crystal current alternating signal FR. In this embodiment, the low frequency timing signals (latch pulse LP, frame start pulse YD, and liquid crystal current alternating signal FR) required by LCD module 200 are generated by timing signal generator 120. When host MPU 10 completely changes the display data of VRAM 12 during the refresh operation or partially changes the data when using a frame sampling gradation display, host MPU 10 sets the transfer command flag in the corresponding address of line flag register 132 via system bus 14a and system bus interface circuit 131. Because the line address signal RA from vertical counter 122 is updated each time the latch pulse LP is generated, comparator 133 emits coincidence signal j when line address signal RA coincides with the flag address of the set transfer command flag. The coincidence signal j is input to synchronization adjuster 134, and the intermittent operation start control signal $\overline{ST}$ rises for one horizontal period synchronized to the drop of the latch pulse LP as shown in FIG. 3. When the intermittent operation start control signal $\overline{ST}$ rises, the oscillation control signal CT output from AND gate 141 rises, causing one input to the AND gate 142 a at the first stage of the CR oscillator to be high. The CR oscillator therefore begins outputting a high frequency oscillation clock $f_H$ according to the feedback constant defined by the combination of open and closed resistance selection switches SW$_1$~SW$_4$. The high frequency clock $f_H$ is supplied through inverter 143a, AND gate 143b, and inverter 143e to preset counter 143c, and is output as shift clock SCL from AND gate 144. This shift clock SCL is a high frequency clock used for DMA circuit 150 display data reading and transferring.

Preset counter 143c is reset at the drop of the intermittent operation start control signal $\overline{ST}$ and the carrier output CA drops to a low level, but when the count rises to the clock count specified by clock frequency register 143d, a high level carrier output CA is output, and the inverted signal of the high level carrier output CA, i.e., the intermittent operation end control signal $\overline{CA}$, drops as shown in FIG. 3. When the intermittent operation end control signal $\overline{CA}$ drops, the oscillation control signal CT also drops, and variable frequency CR oscillator 142 stops oscillating. As a result, variable frequency CR oscillator 142 oscillates intermittently, oscillating only during the period of which the start and end times are defined by the intermittent operation start control signal $\overline{ST}$ and intermittent operation end control signal $\overline{CA}$, and generates the number of high frequency clock $f_H$ signals required to transfer the display data for one scan line as specified by clock count register 143d. As a result, when there is no change in the display data, unnecessary oscillation by variable frequency CR oscillator 142 can be eliminated, thus contributing to reduced power consumption.

When coincidence signal j is output from comparator 133 of standby circuit 130, DMA controller 151 of DMA circuit 150 outputs the read clock RSK over dedicated bus 14b using the high speed clock SCL. The display data (new display data) of the overwrite address in VRAM 12 is thus read as shown in FIG. 3, and input to data conversion circuit 152 as read data SD. The read data SD is converted to the bit number or format of data bus 17, and the display data DATA and shift clock XSCK with a frequency equal to the clock SCK are transferred over data bus 17 to X drivers 250-1~250-N. DMA controller 151 also sends the corresponding flag address signal and flag preset signal to line flag register 132, clearing the transfer command flag of the flag address for the display data read into data conversion circuit 152. When the next line address signal RA is generated, the above operation is repeated by the next high speed clock SCK, and transfer of two lines of display data DATA is completed in one horizontal period. When one scan line of display data DATA is transferred, the inverted carrier signal $\overline{CA}$ is a low level signal, causing the transfer operation to pause. However, since the transfer data is stored in the frame memories 252-1~252-N of the X drivers 250-1~250-N, there is no affect on the display even if the shift clock XSCL is turned on and off each scan line.

By providing frame memories 252-1~252-N in the X drivers 250-1~250-N, and providing low frequency oscillator 110 and intermittently operating high frequency oscillator 140, it is possible to restrict transfer of the display data for each scan line to the frame memories 252-1~252-N, to only when the display data in VRAM 12 is changed. Because constant operation of the high frequency oscillator 140 is thus eliminated, total power consumption can be significantly reduced unless the display data is changed.

This intermittent operation is compatible with frame sampling gradation displays and displays with a small moving image area in the display, and offers good compatibility with existing display systems.

It is to be noted that high frequency oscillator 140 of module controller 100 features variable frequency CR oscillator 142, but it can also be constructed with a phase synchronized circuit (PLL) generating a high frequency clock synchronized to the latch pulse LP. In this case, the high frequency clock is obtained from the output of a voltage controlled oscillator in the phase synchronized circuit.

In addition, high frequency oscillator 140 can also be replaced by an external high frequency clock source rather than being built into module controller 100. Alternatively, module controller 100 can be integrated onto the same chip as host MPU 10 or VRAM 12, thereby reducing the number of connection buses.

Multiple Line, Selection Drive Method

The construction and operation of the X driver (signal electrode drive circuit) 250 is described next. Preceding this description, however, the principle of multiple line selection method on which the invention is based is first described in order to simplify understanding of the X driver construction. This is necessary because the simple matrix-type liquid crystal display of the invention is based on an improvement of the method of simultaneously selecting plural scan electrodes, i.e., the multiple line selection method, rather than the conventional voltage averaging liquid crystal drive method.

When driving a simple matrix-type liquid crystal display element as shown in FIG. 4 by the voltage averaging multiplex drive method, the scan electrodes $Y_1, Y_2, \ldots Y_n$ are usually sequentially selected one by one, and the scan voltage is applied. At the same time, the signal electrode wave is applied to the signal electrodes $X_1, X_2, \ldots X_m$ according to the on/off state of the various elements on the selected scan electrode to drive the liquid crystal elements.

An example of the applied voltage wave is shown in FIG. 5. FIG. 5 (a) and (b) are the voltage waves applied to scan electrodes $Y_1$ and $Y_2$, respectively, (c) is the voltage wave applied to signal electrode $X_1$, and (d) is the combined voltage wave applied to the pixel at the intersection of scan electrode $Y_1$ and signal electrode $X_1$.

In this drive method sequentially selecting the scan electrodes one line at a time, the drive voltage is relatively high. In addition, a relatively high voltage is applied even in the off state as shown in FIG. 6, and high attenuation of the voltage in the on state results in poor contrast. Noticeable flicker during frame gradation is another problem.

A so-called multiple line selection drive method whereby plural sequential scan electrodes are simultaneously selected and driven has therefore been proposed as a means of improving contrast and reducing flicker. (See *A Generalized Addressing Technique Forms Responding Matrix* LCDs 1988, International Display Research Conference, pp. 80–85).

FIG. 7 shows an example of the applied voltage wave when driving the liquid crystal elements using the above multiple line selection method. In this example, three scan electrodes are simultaneously selected and driven. In a pixel display as shown in FIG. 4, the first three scan electrodes $Y_1$, $Y_2$, $Y_3$ are simultaneously selected, and a scan voltage as shown in FIG. 7 (a) is applied to the scan electrodes $Y_1$, $Y_2$, $Y_3$.

The next three scan electrodes $Y_4$, $Y_5$, $Y_6$ are then selected, and a scan voltage pattern as shown, for example, in FIG. 7 (b) is applied. This operation is sequentially executed for all scan electrodes $Y_1, Y_2, \ldots Y_n$. The potential is then reversed at the next frame, thus enabling alternate current driving of the liquid crystals.

In the conventional voltage averaging drive method, one scan electrode is selected once in each single frame period. In the multiple line selection method the selection time is evenly distributed on a time basis in one frame, retaining the normal orthogonality of the scan selection method while simultaneously selecting a specific number of scan electrodes as a block with a spatial distribution. "Normal" here means that all scan voltages have the same effective voltage (amplitude) in one frame period. "Orthogonal" means that the voltage amplitude applied to any given scan electrode added to the voltage amplitude applied to another scan electrode during one selection period equals zero (0) in one frame period. This normal orthogonality is the major premise for independent on/off control of each pixel in a simple matrix LCD. For example, referring to the example in FIG. 7, if the level of $V_1$ is 1 and $-V_1$ is $-1$ when selected, the line-column equation $F_3$ for one frame can be abbreviated as $$F_3 = \begin{bmatrix} 1 & 1 & -1 & 1 \\ 1 & -1 & 1 & 1 \\ -1 & 1 & 1 & 1 \end{bmatrix} = (f_{ij}) \qquad \text{Eq. 1}$$

because the unselected period is 0. For example, the orthogonality of the first line ($Y_1$) and second line ($Y_2$) is verified as $$\sum_{j=1}^{4} f_{1j} \times f_{2j} = 1 + (-1) + (-1) + 1 = 0 \qquad \text{Eq. 2}$$

A detailed description of orthogonality is simplified below because of the mathematical content. It is sufficient to note that when driving liquid crystals, the low frequency component is a cause of flicker. As a result, it is necessary to select the minimum number of lines and columns necessary to maintain orthogonality when simultaneously selecting h lines. In general, when simultaneously selecting lines, the minimum number of columns required in the distributed selection (the "minimum required distributed selection number") in one frame, equivalent to the number of columns in the above column/line equation (1), is the value $2^n$ where n is a natural number and the equation $$2^{n-1} < h \leq 2^n$$

is true. For example, the minimum required distributed selection number for simultaneous selection of three lines shown in FIG. 8 is 4. When $h=2^n$, the single selection period $\Delta t$ is equal to the single selection time (1 H) in the voltage averaging method.

In the signal voltage wave form, one level of the (h+1) distributed voltage levels is determined according to the display data. In the voltage averaging method, the signal electrode (line) wave form corresponds directly to the single line selection wave form as shown in FIG. 5, and one of the two levels (corresponding to on/off levels) is output. When h lines are simultaneously selected as shown in FIG. 7, it is necessary to output an equivalent on/off voltage level for the line selection wave in a set of h lines. This equivalent on/off voltage level is determined by the anti-coincidence C between the signal electrode data pattern $(S_{1d}, S_{2d}, \ldots Sh_{hd})$ and the column pattern (scan electrode selection pattern) of the above row/column equation when the values of the on display data and off display data are "1" and "0", respectively.

$$C = \sum_{i=1}^{h} (f_{il} \oplus S_{il}) \qquad \text{Eq. 3}$$

Note, however, that where the value of $f_{i1}$ in Eq. 1 is "1," a value of "0" is used in Eq. 3.

The value of C above ranges from 0 to h. In the voltage averaging method, the value of C ranges from 0 to 1 because the value of h=1. In the example shown in FIG. 7, the signal electrode data pattern and X driver output potential are as shown in Table 1. The number of data patterns for each anti-coincidence number shown in Table 1 is the same for each column. As a result, if the column pattern is determined, the output potential of the X driver can be determined by directly decoding the X driver output potential from the anti-coincidence number or signal electrode data pattern. Specifically, the signal electrode voltage wave shown in FIG. 7 (c) is obtained.

TABLE 1

| Anti-coincidence | Signal Electrode Data Pattern | No. of Data Patterns | X Driver Output Voltage |
| --- | --- | --- | --- |
| C = 0 | (1,1,1) | 1 | $-V_3$ |
| C = 1 | (0,1,1) (1,0,1) (1,1,0) | 3 | $-V_2$ |
| C = 2 | (1,0,0) (0,1,0) (0,0,1) | 3 | $V_2$ |
| C = 3 | (0,0,0) | 1 | $V_3$ |

Display of the intersecting pixels of signal electrode $X_1$ and scan electrodes $Y_1$, $Y_2$, and $Y_3$ in FIG. 4 is, in sequence, 1 (on) ; 1, 0 (off). The corresponding potential values of the scan electrodes during the initial $\Delta t$ are, in sequence, 1 ($V_1$), 1, 0 ($-V_1$). Because the anti-coincidence number is therefore zero, the output potential during the initial $\Delta t$ is of signal electrode $X_1$ is $-V_3$ (see Table 1). The output potential wave for each signal electrode is similarly applied to each of the pixels. Shown in FIG. 7(d) is the voltage wave applied to the pixels at the intersection of the scan electrode $Y_1$ and signal electrode $X_1$, i.e., the combination of the voltage wave applied to the scan electrode $Y_1$ and the voltage wave applied to the signal electrode $X_1$.

As described above, the method whereby plural sequential scan electrodes are simultaneously selected and driven achieves the same on/off ratio as the conventional method whereby the lines are selected one by one as shown in FIG. 5, but also offers the advantage of minimizing the drive voltage on the X driver side. For example, if the liquid crystal threshold value $V_{TH}$ is 2.1 V and the duty ratio is 1/240, the maximum drive voltage amplitude on the X driver is approximately 8 V. This means it is not necessary to use a high voltage resistance integrated circuit for the X driver. This makes it possible to apply higher resolution semiconductor manufacturing processes than is possible with the conventional method, and makes it possible to economically increase the bit number of the built-in RAM of the X driver.

The applicant for the present invention has previously described the multiple line selection drive method described above in Japanese patent application 1992-143482. In the uniform distribution, multiple line selection drive method, the matrix display device using is characterized by a drive circuit for simultaneously selecting sequential plural scan electrodes, and dividing the selection period to apply a voltage plural times within one frame. In other words, rather than selecting the display lines once per frame (period h $\Delta t$), the display is driven by dividing each frame into plural selection periods, and the voltage is thus applied plural times within a single frame. The voltage is thus applied plural times to each pixel in one frame, thereby maintaining brightness and suppressing the drop in contrast. The resulting effect is especially significant when used in high speed response liquid crystal panels with a low cumulative response effect.

As shown in FIG. 8, the unselected period (the time from first selection of a given scan electrode until the same scan electrode is selected again) is shortened, the on state is brighter, the off state is darker, and contrast is therefore increased when compared with the conventional example shown in FIG. 6. Flicker can also be reduced. Thus, the improved multiple line selection drive method distributes output of the plural scan electrode pulse patterns rather than outputting the pulse patterns in a batch. It is to be noted that any sequence can be used for outputting the selection pulse of each selection period in this embodiment, and the sequence can be changed as needed within one frame. In addition, four column patterns are each separated into four parts, but any other plural combination, for example two patterns separated into two parts, can also be used.

Before getting too deep into a discussion of the multiple line selection drive method, description of the driver is resumed. It should be noted, however, that the LCD of the present embodiment uses a uniform distribution, multiple line selection drive method and the driver has a built-in frame memory, but is controlled by module controller 100. It should therefore be understood that the driver must meet the requirements of both.

Description of the Scan Electrode Drive Circuit
(Y Driver)

In the multiple line selection drive method of the driver described below, the number of simultaneously selected scan electrodes is defined as the smallest possible number, i.e., h=2, in order to simplify understanding of the circuit function. Therefore, as shown in FIG. 9, the column pattern of the scan electrode wave is equal to $2^1=2$ columns only. By applying two different pulse patterns to two successive scan electrodes, one frame consists of two fields (2 vertical scans). If the total number of scan electrodes is 120, there will be 60 2-scan electrode blocks to be simultaneously selected. The unselected period for any given block from the application of two different pulse patterns to the application of the next two different pulse patterns is $(60 \cdot 1) \Delta t = 59 \Delta t$. One frame is completed in 120 $\Delta t$ where $\Delta t$ is equal to one selection period (one horizontal period).

As shown in FIG. 10A, Y driver IC 220 is a semiconductor integrated circuit comprising code generator 221 for generating the column pattern of each field based on frame start pulse YD and the latch pulse LP. The voltage applied to scan electrodes $Y_1 \sim Y_n$ in this embodiment has three possible levels: $V_1$ or $-V_1$ in one selection period, and 0 V during the unselected period. The selection control information for voltage selector 222 must have two bits for each of the scan electrodes $Y_1 \sim Y_n$. Code generator 221, required for multiple line selection, therefore initializes the field counter (not shown in the figures) and first and second shift registers 223, 224 at frame start pulse YD, and outputs the 2-bit voltage selection codes $D_0$, $D_1$ corresponding to the selected column pattern for the first field to the series-parallel conversion first shift register 223 and second shift register 224. Both shift registers 223, 224 are 120-bit shift registers, corresponding to the number of scan electrodes. First shift register 223 stores the least significant bit (voltage selection code $D_0$), and second shift register 224 stores the most significant bit (voltage selection code $D_1$), based on the same shift clock CK. The shift clock CK is the ½-frequency divided latch pulse LP, and is generated by the timing signal generator (not shown in the figures) of code generator 221. During the period from the second clock count of the latch pulse LP to the end of the first field, code generator 221 generates the code for the unselected pattern. Because parallel 120-bit shift registers 223, 224 operating at the same shift clock CK are provided instead of a single 240-bit shift register for the shift clock CK, the shift registers can operate at a lower frequency based on the latch pulse LP, and operation at an extremely low power consumption level is possible.

The voltage selection codes $D_0$, $D_1$ output by first and second shift registers 223, 224 are shifted to the adjacent bit when the shift clock CK is output, and output is held for the selection period $\Delta t$ only. The shift register output is sent to level shifter 226 for conversion from a low logic amplitude level to a high logic amplitude level. The voltage selection codes $D_0$, $D_1$ output as a high logic amplitude level from level shifter 226 are supplied together with the liquid crystal current alternating signal FR, which was simultaneously level converted, to decoder 227, which functions as a wave shaper, for generation of the selection control signal. By controlling voltage selector 222 with this selection control signal, voltage $V_1$, 0, or $-V_1$ is supplied to scan electrodes $Y_1 \sim Y_n$.

As shown in FIG. 10B, it is assumed that the function of code generator 221 can be changed using selection terminals MS in the first stage Y driver 1 and each of the successive Y drivers 2~n so that plural Y drivers 1~n can be cascaded. In other words, in the first stage Y driver 1, the Y driver is first initialized at frame start pulse YD, and operation then shifts to the timing for generating the voltage selection codes used by the two shift registers 223, 224. Because the selection terminal MS is a low level input in the following stages, however, they do not automatically shift to the voltage selection code generating timing. Only after the first stage carrier signal FS is input to the FSI input terminal of the downstream Y drivers 2~n do the Y drivers output the voltage selection codes to the two shift registers 223, 224. The first field ends when the carrier signal FS is output from the last Y driver n. Because the start signal for the second field is not input at this time, the carrier signal FS from the last Y driver n is fed back to the FSI terminal of the first Y driver 1 and to the FS terminal of the X driver, and the voltage selection code for the second field is generated for the two shift registers 223, 224. The same operation described above is then executed for the second field, and operation then shifts to the next first field.

This function alleviates the restrictions on the number of simultaneously selected lines for the controller and the number of Y driver terminals, and enables the use of the same-frequency frame start pulse YD and latch pulse LP as used in the conventional voltage averaging method.

Description of the Signal Electrode Drive Circuit (X Driver)

The plural X drivers 250-1~250-N are identically constructed semiconductor integrated circuits cascade connected by the chip enable output CEO and chip enable input CEI terminals as shown in FIG. 1. Unlike the conventional drives with built-in RAM, these X drivers 250-1~250-N do not share system bus 14 connecting directly to host MPU 10, but are simply connected to module controller 100 via data bus 17. As shown in FIG. 11, each of the X drivers 250-1~250-N comprises chip enable controller 251, timing circuit 253, data input controller 254, input register 255, write register 256, line address register 257, signal pulse assignment circuit 258, level shifter 259, and voltage selector 260.

Chip enable controller 251 is an active LOW automatic power saving circuit. Timing circuit 253 generates the required timing signals based on the signals supplied from primarily module controller 100. Data input controller 254 reads the display data DATA sent from module controller 100 at the enable signal E. Input register 255 sequentially reads the display data DATA (1 bit, 4 bit, or 8 bit) at each shift clock XSCL drop, and stores one scan line equivalent of display data DATA. Write register 256 batch latches one scan line equivalent of display data DATA from input register 255 at the latch pulse LP drop, and writes the data to the memory matrix of frame memory (SRAM) 252 within the write time, which is equal to or longer than one shift clock XSCL. Line address register 257 is initialized by the scan start signal YD, and sequentially selects the line (word bus) from frame memory 252 each time the write control signal WR or read control signal RD is applied. Signal pulse assignment circuit 258 assigns the drive voltage information for the signal electrodes corresponding to the combination determined by the display data from frame memory 252 and the scan electrode column pattern. Level shifter 259 converts the low logic amplitude level signal from signal pulse assignment circuit 258 to a high logic amplitude level signal. Voltage selector 260 selects voltage $V_2$, M (e.g., 0), or $-V_2$ based on the high logic amplitude level voltage selection code signal output from level shifter 259, and applies the selected voltage to the signal electrodes $X_1 \sim X_n$.

Known technologies are used in chip enable controller 251, which controls the power save function separately for each driver chip, and the related circuit components. Chip enable controller 251 generates the internal enable signal for the enabled drivers only, thus causing the shift clock XSCL and display data DATA to be read into the enabled drivers, and controls operation of timing circuit 253 and data input controller 254. This control sequence is repeated at each latch pulse LP cycle. In other words, when the latch pulse LP is input, chip enable controller 251 switches all cascaded driver chips from the power save state to the standby state, and the chip enable output CEO becomes HIGH. Which drivers are enabled or set to the power save state is determined by the state of chip enable input CEI. In the embodiment of FIG. 1, chip enable input CEI of X driver 250-1 is grounded (active). The internal enable signal E therefore becomes active, and the shift clock XSCL and display data DATA are read into the driver. Chip enable controller 251 switches the chip enable output CEO from a HIGH to a LOW level when the number of shift clocks required to read the display data equal to the bit capacity of input register 255 has been input. The chip enable input CEI for the next-stage X driver 250-2 cascade connected to first X driver 250-1 therefore becomes LOW, causing the internal enable signal E of the next-stage driver to become active. This same operation is repeated for each of the cascaded X drivers. As a result, chip enable input CEI for the third to nth X drivers 250-3~250-n is sequentially set to a LOW level, and the display data is read into the corresponding input register 255.

As a result, there is only one X driver reading the display data at any one time and the power consumption required for display data reading can be minimized even when n X drivers are cascaded.

Time circuit 253 is described below with reference to FIG. 12 while omitting part of the detailed description. As shown in FIG. 12, timing circuit 253 comprises AND gate 253a, NAND gate 253b, AND gate 253c, inverter 253d, a first one-shot multivibrator 253-1, second one-shot multivibrator 253-2, third one-shot multivibrator 253-3, shift clock detector 253-4, and write prohibit AND gate 253-5.

AND gate 253a inputs the shift clock XSCL based on enable signal E response into timing circuit 253. AND gate 253c generates two precharge ready pulses within one latch pulse LP cycle based on the delayed inversion pulse of the latch pulse LP and write control signal WR input to timing circuit 253 through NAND gate 253b in response to the enable signal E.

First one-shot multivibrator 253-1 generates the precharge control signal PC of a predetermined pulse width at the rise of the AND gate 253c output pulse, thus functioning as the precharge control signal PC generator.

Second one-shot multivibrator 253-2 is cascade connected to first one-shot multivibrator 253-1, and generates the write control signal WR of a predetermined pulse width at the rise of the delayed inversion pulse of the precharge control signal PC and the inversion pulse of the latch pulse LP. Second one-shot multivibrator 253-2 thus functions as the write control signal WR generator.

Third one-shot multivibrator 253-3 is cascade connected to second one-shot multivibrator 253-2, and generates the read control signal RD of a predetermined pulse width at the rise of the delayed inversion pulse of the precharge control signal PC and the delayed inversion pulse of the write control signal WR. Third one-shot multivibrator 253-3 thus functions as the read control signal RD generator.

Shift clock detector 253-4 is reset by the inverse phase shift clock XSCL, which is inverted by inverter 253d, to detect shift clock XSCL input.

Write prohibit AND gate 253-5 passes or interrupts the write control signal WR input from second one-shot multivibrator 253-2 as controlled by the shift clock detection signal WE from the shift clock detector 253-4.

First one-shot multivibrator 253-1 comprises a flip-flop formed by NAND gates 253e, 253f, AND gate 253c, NAND gate 253g, inverter 253h, delay circuit 253i, NAND gate 253f, and inverter 253j.

The flip-flop formed by NAND gates 253e, 253 f set node $N_1$ HIGH at the drop in the output of AND gate 253c. NAND gate 253g and inverter 253h generate a HIGH precharge control signal PC when node $N_1$ is HIGH. Delay circuit 253i delays the precharge control signal PC assuming an equivalent signal delay time in frame memory 252. Inverter 253j inverts the precharge control signal PC, and applies the inverted signal to the RESET input of NAND gate 253f.

When the input to the SET input terminal of NAND gate 253e drops, node $N_1$ is set to a HIGH level, and when the AND gate 253c output next becomes HIGH, the precharge control signal PC rises. As a result, the NAND gate 253f RESET input drops after the delay time determined by delay circuit 253i, and node $N_1$ becomes LOW, thus causing the precharge control signal PC to drop. The precharge control signal PC pulse is generated twice during one latch pulse LP cycle because the AND gate 253c output rises at the latch pulse LP rise and at the rise of the delay signal for the write control signal WR.

Second and third one-shot multivibrators 253-2 and 253-3 are nearly identical in structure to first one-shot multivibrator 253-1, and like parts are therefore identified with like reference numerals in FIG. 12. Second one-shot multivibrator 253-2 differs from first one-shot multivibrator 253-1 in that NAND gate 253g' takes three inputs, the delayed inversion signal of precharge control signal PC, the inverted latch pulse LP signal, and node $N_2$ of NAND gate 253e, and delay circuit 253k delays write control signal WR assuming an equivalent signal delay time in frame memory 252. Node $N_2$ of NAND gate 253e is set HIGH at the drop in the latch pulse LP inversion signal, but the output of NAND gate 253g' drops at the first drop in precharge control signal PC (the first rise in the delayed inversion signal of precharge control signal PC). Write control signal WR thus rises, the RESET input to NAND gate 253f drops after waiting the delay time determined by delay circuit 253k, and node $N_2$ becomes LOW, thus causing write control signal WR to drop. The delayed inversion signal of the second precharge control signal PC then rises, but node $N_2$ remains HIGH because the latch pulse LP is LOW. The output of NAND gate 253g' therefore remains HIGH, and only one write control signal WR pulse is output, based on the drop in the first precharge control signal PC, during one latch pulse LP cycle.

Third one-shot multivibrator 253-3 differs from first one-shot multivibrator 253-1 in that NAND gate 253g' takes three inputs, the delayed inversion signal of precharge control signal PC, the delayed inversion signal of the write control signal WR, and node $N_3$ of NAND gate 253e, and delay circuit 253k delays the write control signal WR assuming an equivalent signal delay time in frame memory 252. Node $N_3$ of NAND gate 253e is set HIGH at the drop in the delayed inversion signal of the write control signal WR (the rise in the write control signal WR) occurring after the first drop in the precharge control signal PC (the first rise in the delayed inversion signal of the precharge control signal PC). As a result, the output of NAND gate 253g' drops at the first drop in the second precharge control signal PC (the first rise in the delayed precharge control signal PC inversion signal), and the read control signal RD rises. After the delay time determined by delay circuit 253m, the NAND gate 253f RESET input rises and node $N_3$ becomes LOW, thus causing the read control signal RD to drop. Only one read control signal RD pulse of the predetermined pulse width is therefore output, based on the drop in the second precharge control signal PC, during one latch pulse LP cycle.

Shift clock detector 253-4 comprises a D flip-flop 253s and D flip-flop 253t. D flip-flop 253s has three inputs, the inverse phase clock of the shift clock XSCL as the RESET input $\overline{R}$, a ground potential (i.e., LOW) as the data input, and a clock input. This LOW level is input at the rise of the latch pulse LP inversion clock, and stored as the data inversion input $\overline{D}$. D flip-flop 253t stores the inversion output $\overline{Q}$ of D flip-flop 253s as the data inversion input $\overline{D}$ at the rise of the latch pulse LP inversion clock.

When shift clock XSCL is input, D flip-flop 253s is reset at the first shift clock XSCL pulse, and the D flip-flop 253s output ($\overline{Q}$) is HIGH. Because the ground potential is stored as the data inversion input $\overline{D}$ to D flip-flop 253s at the latch pulse LP drop, the $\overline{Q}$ output becomes LOW and D flip-flop 253t stores the HIGH data inversion input $\overline{D}$ before $\overline{Q}$ changes, and the $\overline{Q}$ output, i.e., the shift clock detection signal WE, becomes HIGH. When the next shift clock XSCL is input, D flip-flop 253s is reset and the $\overline{Q}$ output of D flip-flop 253s is again HIGH. The shift clock detection signal WE output from D flip-flop 253t therefore remains HIGH for as long as the shift clock XSCL is input, continuity remains through write prohibit AND gate 253-5, and the write control signal WR from second one-shot multivibrator 253-2 continues to be input to the frame memory.

When input of the second shift clock XSCL stops, the $\overline{Q}$ output of D flip-flop 253s remains LOW according to the last shift clock XSCL pulse, and the latch pulse LP is input, the shift clock detection signal WE from D flip-flop 253t becomes LOW, write prohibit AND gate 253-5 closes, and the write control signal WR is interrupted.

Referring to FIG. 13, the circuit configuration of one X driver 250, including the peripheral circuits, frame memory 252 and signal pulse assignment circuit 258, level shifter 259, and voltage selector 260, is described by focusing on the m-bit circuit 250m for one signal electrode (one output Xm). Memory cells $C_{2i-1, m}$, $C_{2i,m}$ are at the intersection of odd word bus $W_{2i-1}$ and even word bus $W_i$ and bit buses $BL_m$ and $\overline{BL_m}$ in the frame memory 252 memory matrix, and store the display data (on/off data) for the corresponding pixels $P_{2i-1,m}$, and $P_{2i,m}$. When the latch pulse LP is generated, precharge control signal PC and write control signal WR or read control signal RD are generated from timing circuit 253. By applying the signals to frame memory 252, odd word bus $W_{2i-1}$ is selected by the line address decoder in frame memory 252 through sequential specification by line address register 257, and data is written to or read from memory cell $C_{2i-1,m}$. When the next latch pulse LP is generated, the even word bus $W_i$ is selected, and data is written to or read from memory cell $C_{2i,m}$. Note that the read operation is activated by applying the read control signal RD to sense circuit 252m, and the display data is thus output from the memory cell.

Due to the use of a two-line selection drive method as described above in the X driver 250 according to the present invention, it is necessary to determine the signal electrode potential from the display data and scan electrode column pattern for two lines in one horizontal period. An even/odd line discrimination circuit 250a (line number discrimination circuit for simultaneously selected lines) is provided in the peripheral circuitry.

This even/odd line discrimination circuit 250a comprises a D flip-flop 250aa, odd line detection NAND gate 250ab, and even line detection NAND gate 250ac. The D flip-flop 250aa is reset by the inverse phase pulse of frame start pulse YD input through inverter 250b, and inverts the stored contents each time the read control signal RD is input.

There are two inputs to odd line detection NAND gate 250ab and even line detection NAND gate 250ac, D flip-flop 250aa output $\overline{Q}$ and latch pulse LP, and D flip-flop 250aa output Q and latch pulse LP, respectively. When the odd line number latch pulse LP rises, output LP1 of odd line detection NAND gate 250ab drops; when the latch pulse LP drops, output LP1 rises. When the even line latch pulse LP rises, output LP2 of even line detection NAND gate 250ac drops; when the odd line number latch pulse LP drops, output LP2 rises. Outputs LP1 and LP2 are thus alternately output. Even/odd line discrimination circuit 250a generates latch pulses LP1 and LP2 for even and odd lines from the latch pulse LP generated by module controller 100.

Because the uniform distribution, 2-line selection drive method is used in the above embodiment, there are only $2^1=2$ voltage pulse patterns for the scan electrodes. Two fields are required to apply these patterns because two different column patterns are applied to two successive scan electrodes. However, because the current alternating signal FR inverts every frame, all column patterns can be applied in four fields. A field state circuit 250c specifying the potential pattern of the scan electrodes is therefore provided in the peripheral circuitry. This potential pattern information can be obtained from the scan electrode driver code generator 221 or module controller 100 rather than being generated in the X driver.

Field state circuit 250c comprises D flip-flop 250ca, AND gate 250cb, inverter 250cc, AND gate 250cd, and OR gate 250ce. D flip-flop 250ca is reset by the inverse phase pulse of frame start pulse YD, and inverts the stored data at each field start pulse FS input. AND gate 250cb takes two inputs, the Q output of D flip-flop 250ca and current alternating signal FR. AND gate 250cd also takes two inputs, the $\overline{Q}$ output of D flip-flop 250ca, and the current alternating signal FR after inversion by inverter 250cc. The outputs from AND gates 250cb, 250cd are input to OR gate 250ce.

The display data (on/off information) from memory cell $C_{2i,m}$ is input to one bit latch circuit 258-1m of signal pulse assignment circuit 258 at latch pulse LP1 generated during odd line reading, and is supplied to the least significant bit exclusive OR gate $EX_1$ of anti-coincidence detector 258-2m. display data (on/off information) from memory cell $C_{2i,m}$ is then supplied to the most significant bit exclusive OR gate $EX_2$ of anti-coincidence detector 258-2m at the following even line latch pulse LP2.

Because the latch pulses LP1 and LP2 are alternately output, the latch period of the latch circuits 258-1, 258-3 have an alternately overlapping period, and the display data (on-on, on-off, off-on, off-off) from both memory cells is simultaneously supplied to the anti-coincidence detector 258-2m. Because the information equivalent to the column pattern for two scan electrodes is also supplied to anti-coincidence detector 258-2m, anti-coincidence detector 258-2m detects the column anti-coincidence of the 2-bit display data and 2-bit scan electrode data. Because two bits are output when two lines are simultaneously selected, the output from anti-coincidence detector 258-2m can be directly processed as the coded anti-coincidence value.

In this embodiment there are three possible anti-coincidence values: 0, 1, or 2. The 2-bit data obtained by anti-coincidence detector 258-2m is input to latch circuit 258-3, and the anti-coincidence signal is converted to a high logic amplitude signal by level shifter 259m. Decoder 260a of voltage selector 260m decodes the anti-coincidence signal, and opens or closes one of the transistors in selector switch 260b to select signal electrode potential $-V_2$, 0, or $V_2$. In this embodiment, $-V_2$ is selected when the anti-coincidence value is 0, 0 when the anti-coincidence value is 1, and $V_2$ when the anti-coincidence value is 2. Uniform distribution, 2-line selection and drive is thus possible with an X driver configured as described above.

It is to be noted that the circuit can also be configured to directly decode the drive data from the frame memory output and field state circuit 250c output without using anti-coincidence evaluation.

While the structure and operation of the various components of the X driver in this embodiment may be understood from the above description, the frame memory write and read operations are further described below with reference to the timing chart in FIG. 14.

Frame start pulse YD and latch pulse LP as shown in FIG. 14 are generated by timing signal generator 120 of module controller 100. Frame start pulse YD is generated once each frame period (1F), and the latch pulse LP is generated twice each horizontal period (1 H). N latch pulses LP are generated during one frame period. In one latch pulse LP period, one scan line equivalent of display data DATA ($WD_i$) is sent from module controller 100 to X driver IC 250 based on the shift clock XSCL. The read/write operation when the display data DATA stored in VRAM 12 is changed for all scan lines other than the third scan line (display data WD3) is shown in FIG. 14. The display data WD3 for the third scan line is therefore not transferred again, and the display operation for the third scan line is completed by reading the old data from frame memory 252.

Read control signal RD, shift clock detection signal WE, and write control signal WR shown in FIG. 14 are generated by timing circuit 253 of X driver IC 250. When transfer of the new data WD2 to X driver IC 250 is completed by module controller 100, shift clock XSCL transfer is also interrupted. The next step is transfer of new data WD4 and shift clock XSCL generation. When shift clock XSCL is interrupted, module controller 100 enters the standby period S as described above. This is detected by shift clock detector 253-4 of timing circuit 253, and the shift clock detection signal WE is not output. As a result, it is not just the write control signal (W3) that is not generated. When the first latch pulse (LN) is emitted, the display data (WD1) for the first line is input to X driver IC 250 within the period before the next latch pulse (L1) is generated (within latch pulse one cycle), input to write register 256 at the latch pulse (L1), and written to the corresponding address in frame memory 252. The old data for the first line is also read from frame memory 252 within the period between the first latch pulse (LN) and the next latch pulse (L1). When the latch pulse LP is generated, the first precharge control signal PC1 (period C) is asserted and then the write control signal WR (period A) is emitted. The read control signal RD (period B) is asserted after the second precharge control signal PC2 (period C) is emitted. If the shift clock XSCL is not active, however, the write mode is disabled, and read control signal R1 therefore causes the old data for the first line to be read.

The line address of the first line is specified by line address register 257 during this read operation. The old data for the first line is read from frame memory 252 based on the odd number latch pulse LP 1 resulting from the next latch pulse (L1), and the old data is thus stored in latch circuit 258-1$m$ and sent to the least significant bit exclusive OR gate $EX_1$. After latching the old data for the first line, the new data WD1 for the first line is written to the frame memory based on the next latch pulse (L1). When writing the display data for a 640-dot line to frame memory 252, one complete line is batch written from write register 256, which is used as a buffer, over a period of several microseconds rather than writing the data from input register 255 at a shift clock XSCL of several hundred nanoseconds. While a faster write time is required as the display capacity increases, it is preferable for the write operation to access data from write register 256 at the latch pulse. During the period of latch pulse L2, the new data WD 1 for the first line is written, and then the old data for the second line is read based on the read control signal R2 and transferred to the most significant bit exclusive OR gate $EX_2$. At the even line latch pulse LP2, the 2-bit anti-coincidence data obtained by anti-coincidence detector 258-2 is latched by latch circuit 258-3, the appropriate signal voltage is selected by voltage selector 260 as described above based on the anti-coincidence value, and the signal electrode potential for the first and second scan lines is applied to the liquid crystal matrix.

As thus described, frame memory 252 according to the present invention provides a write mode and a read mode for a single line address within the period of one latch pulse, and writes the new data at the next latch pulse after reading the old data. As a result, the period from display data writing to reading is one frame period (1F). This is needed for the use of a multiple line selection drive method. This is because anti-coincidence detector 258-2 will cause a signal electrode drive wave resulting in an unintelligible display state based on the old data line and new data line if there is a partial change in the frame memory data during the period in which the display data, which determines the signal electrode drive wave, is read. One frame period (1F) is required from display data writing to reading because there are cases in which all lines will be simultaneously selected. To therefore avoid an unintelligible display state as may occur when scrolling the display, it is sufficient to read the data after one frame period (1F) irrespective of the number of lines selected. At the same time, however, one frame period (1F) is not needed when the number of selected lines is small.

It is also possible to execute the write operation after the read mode to the same line address during one latch pulse LP period. If the write operation follows the read mode, however, timing to assure sufficient write time and for auto-power save operation will be more difficult because writing to the frame memory is executed from write register 256 at the latch pulse LP timing rather than at the shift clock XSCL timing in order to assure sufficient write time in this embodiment. This read-write mode sequence is particularly difficult when using the multiple line selection drive method because the latch pulse and shift clock must be several times faster than in conventional methods. In a large capacity display, this sequence becomes even more difficult. It is therefore preferable to execute the read mode one or plural times after a write operation to the same line address within the period of one latch pulse, and to write the new data one frame period after reading the old data.

The frequency dividing ratio of timing signal generator 120 in module controller 100 is set to generate two latch pulses LP during one horizontal period in the above embodiment because it is necessary to read two lines of display data from the frame memory within one horizontal period due to the use of the uniform distribution 2-line, selection drive method. This is also because the most common cell arrangement in the memory matrix of the frame memory is assumed, specifically, the number of signal electrodes in the display matrix is equal to the number of column addresses in the frame memory, and the number of scan electrodes is equal to the number of line addresses. However, if a RAM device is used wherein the number of column addresses in the frame memory is twice the number of signal electrodes in the display matrix, and the number of line addresses is half the number of scan electrodes (the number of clock signals) as shown in FIG. 15, it is possible to use a latch pulse LP generated once during one horizontal period as in conventional devices. In other words, if the read mode is activated by the latch pulse LP, display data for both the first and second lines is output simultaneously through sense circuit 252$m$ from the memory cells $C_{2i,\ 2m}$, $C_{2i,\ 2m+1}$ associated with the odd word bus $WL_{2i}$ of the frame memory, for example, and only one latch pulse LP is required to read two lines of display data. In this type of circuit configuration, latch circuit 258-1$m$ (shown in FIG. 13) used to hold one line of display data until the second line of display data is output can be eliminated. This simplifies the driver cell circuit construction without complicating the timing adjustment of the high speed first latch pulse LP1 and second latch pulse LP2, and thus contributes to the practical viability of the multiple line selection drive method.

With the circuits shown in FIGS. 15–16, however, the speed at which the frame memory word bus address advances at the latch pulse LP input is faster in the read operation than the write operation. To compensate, line address register 257' has an independent write address W generator counter 261 and read address generator R counter 262, selects the appropriate output using multiplexer 263, and applies the output RA of multiplexer 263 to address decoder 252'd. Write address W generator counter 261 is initialized at frame start pulse YD, and generates the write address using the precharge control signal PC and write control signal WRT shown in FIG. 12. Read address generator R counter 262 is initialized at frame start pulse YD, and generates the read address using the precharge control signal PC and read control signal RD shown in FIG. 12. It is therefore possible to transfer the display data from the controller to the X driver within the period of the same latch pulse LP as in a conventional method controller irrespective of the number of simultaneously selected lines when using a $2^n$ multiple line selection drive method.

Generalizing this 2-line simultaneous read method, the overall structure of the X driver used to simultaneously read plural lines of display data from the frame memory in this multiple line selection drive method is described briefly below with reference to FIG. 16. It is assumed that the row-column configuration of memory matrix 252'a of frame memory 252' is $$(h \bullet 2^n \bullet D) \bullet W$$

where h: number of scan electrodes simultaneously selected and driven in the multiple line selection drive method, n: natural number, D: number of driver outputs per one X driver (the number of driveable signal electrodes), W: number of word buses.

The value $(h \bullet 2^n \bullet D) \bullet W$ is therefore equal to the maximum number of display dots that can be driven by one X driver. For reference, the frame memory in FIG. 11 has a capacity of (driver outputs)$\bullet$(display lines).

Referring to FIG. 16, the display data stored in write register 256 is selected by address decoder 252'd through write circuit 252'b and write selector 252'c based on write control signal WR, and is written to the memory cells connected to the word bus. Address decoder 252'd decodes the line address output from line address register 257 in FIG. 11.

During the display data read operation, the $(h \bullet 2^n \bullet D)$ bit display data is read from frame memory matrix 252'a according to the read control signal RD into the read selector 252'e. Read selector 252'e selects $(h \bullet 2^n D)$ bit display data according to the output from address decoder 252'd. When n=0, read selector 252'e is therefore not needed. The $(h \bullet D)$ bit display data is all of the display data that can be simultaneously driven by the X driver during one scan period. The read selector 252'e output is converted to a digital signal by sense circuit 252'f, and sent to multiple line selection/drive decoder (MLS decoder) 258'a of signal pulse assignment circuit 258'. MLS decoder 258'a is reset by the display data, liquid crystal current alternating signal FR, and frame start pulse YD, counts the carrier signal FS from the Y driver, takes the output from state counter 258'c, which identifies the scan state in one frame, and decodes the signal selecting the driver output potential. The MLS decoder 258'a output is synchronized by latch circuit 258'b, which operates at the latch pulse LP clock, and is applied to level shifter 259.

While this circuit uses the multiple line selection drive method, reading the plural lines of display data is completed in one scan, thereby reducing power consumption and simplifying circuit timing.

It is to be noted that while the present invention has been described above with specific reference to a uniform distribution 2-line, selection drive method, it can also be applied to methods simultaneously selecting and driving three or more plural lines. It will be obvious that the invention can also be applied to the voltage averaging drive method used in part in conventional matrix display devices. The invention can also be applied to MIM drive methods, and is not limited to simple matrix methods.

In the above embodiment, the frame memory has memory cells to maintain a 1:1 ratio between display pixels and memory cells, but the invention can also be applied to other frame memory configurations. One such configuration has a frame memory for holding part or plural screens of display data associated with the pixels before and after the currently driven pixels, and intermittently transfers the display data from the module controller to the X driver. Another configuration uses compressed display data for the display elements.

The present invention is not limited to liquid crystal display devices, and can be used in a wide range of matrix-type display apparatus, including fluorescent display, plasma display, and electroluminescent display devices, and in applied liquid crystal displays using the light bulb properties of liquid crystals.

As described above, the present invention is characterized by intermittently operating the oscillation source of the high frequency clock of the matrix display controller when the display data is transferred in a method combining a conventional matrix display controller and a conventional signal electrode driver built in to the memory. By means of this matrix display controller, the total power consumption of the matrix display apparatus can be reduced by intermittent operation of the high frequency clock because the high frequency clock operates and the display data is transferred to the second storage means only when there is a change in the data stored in a first storage means. In addition, address assignment can simplified, and therefore screen rewrite speed can be increased, because the processing load of the host MPU on the first storage means side can be reduced (because the operation transferring data to the second storage means is executed not by the MPU but by an intervening matrix display controller) and the display data for each scan line can be batch stored to the second storage means (by further cascade connecting the signal electrode drive means).

In addition, the number of connections between the matrix display controller and signal electrode drivers can be reduced even in large capacity display devices by cascade connecting the signal electrode drivers, thereby achieving displays with an improved display area ratio.

The signal electrode driver can also easily access the second storage means using a timing signal obtained by dividing one scan period without using a high speed clock. Because the access timing for the second storage means is therefore not as restricted as in conventional methods, write performance can be improved and the size of the transistors forming the second storage means can be reduced. This also contributes to reducing the driver chip size.

When the present invention is applied to the multiple line selection drive method, a high contrast, high speed response, matrix-type liquid crystal display apparatus characterized by low flicker and consuming less power than conventional display devices can be achieved because the display apparatus can be operated at a low frequency even though the data processing required for one display line is greater than that of the conventional drive method.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the subjoined claims.

APPENDIX I

10 . . . host MPU
11 . . . system memory
12 . . . VRAM
13 . . . auxiliary memory
14a . . . system bus
14b . . . dedicated bus
15 . . . input touch sensor
16 . . . touch sensor controller
17 . . . data bus
100 . . . module controller
110a . . . oscillator
120 . . . timing signal generator
121 . . . frequency divider
122 . . . vertical counter
123 . . . frame counter
130 . . . standby circuit
132 . . . line flag register
133 . . . comparator
134 . . . synchronization adjuster
134a . . . inverter
134b . . . D flip-flop
134c . . . AND gate
140 . . . system bus
141 . . . AND gate
142 . . . variable frequency CR oscillator
142a . . . AND gate
142b, 142c . . . inverters
142d . . . switch selection register
$R_1, R_2, R_3$ . . . feedback resistances
C . . . feedback capacitor
$SW_1, SW_2, SW\ 3$ . . . selection switches
143 . . . intermittent operation time limiter
143a . . . inverter
143b . . . AND gate
143c . . . preset counter
143d . . . clock count register
143e . . . inverter
143f . . . inverter
144 . . . AND gate
150 . . . DMA circuit
151 . . . DMA controller
152 . . . data conversion circuit
200 . . . LCD module
220 . . . Y driver IC
221 . . . code generator
222 . . . voltage selector
223 . . . first shift register
224 . . . second shift register
225 . . . latch circuit
226 . . . level shifter
250 . . . X driver IC
250a . . . even/odd line discrimination circuit
250aa . . . D flip-flop
250ab, 250ac . . . NAND gates
250c . . . field state circuit
250ca . . . D flip-flop
250cb, 250cd . . . AND gates
250cc . . . inverter
250ce . . . OR gate
251 . . . chip enable controller
252 . . . frame memory
253 . . . timing circuit
253-1 . . . first one-shot multivibrator
253-2 . . . second one-shot multivibrator
253-3 . . . third one-shot multivibrator
253-4 . . . shift clock detector
253-5 . . . write prohibit AND gate
253a . . . AND gate
253b . . . NAND gate
253c . . . AND gate
253d, 253h, 253j . . . inverters
253e, 253f, 253g, 253g' . . . NAND gates
253i, 253k, 253m . . . delay circuits
253s, 253t . . . D flip-flops
$EX_1, EX_2$ . . . exclusive OR gates
254 . . . data input controller
255 . . . input register
256 . . . write register
257 . . . line address register
258 . . . signal pulse assignment circuit
258-1 . . . latch circuit
258-2 . . . anti-coincidence detector
258-3 . . . latch circuit
259 . . . level shifter
260 . . . voltage selector
252'a . . . memory matrix
252'b . . . write circuit
252'c . . . write selector
252'd . . . address decoder
252'e . . . read selector
258' . . . signal pulse assignment circuit
258'a . . . MLS decoder
258'b . . . latch circuit
258'c . . . state counter

What is claimed is:

1. A display system comprising:
a first read/write memory to store display data from a processor;
a display module comprising:
a matrix display device; and
a second read/write memory;
a read/write controller which reads the display data stored in said first read/write memory, changes the format of the display data read out from said first read/write memory and transfers the display data to said second read/write memory,
wherein said second read/write memory stores at least a portion of the display data read from said first read/write memory; and
a display drive circuit for displaying an image on said matrix display device in accordance with the display data read from said second read/write memory,
wherein said read/write controller reads the display data from said first read/write memory at a data transfer rate different than a data transfer rate of the display data read out from said second read/write memory by said display drive circuit, and
wherein the amount of data transferred from said first read/write memory to said second read/write memory is less than the amount required for said display drive circuit to display said image on said matrix display device.

2. The display system of claim 1, wherein said matrix display device comprises a liquid crystal display.

3. The display system of claim 1, wherein said display drive circuit comprises a plurality of display drivers.

4. The display system of claim 1, wherein said matrix display device comprises a plurality of display elements arranged in a matrix.

5. The display system of claim 1, wherein said matrix display device comprises a plurality of scanning electrodes and a plurality of signal electrodes arranged in a matrix.

6. A display system comprising:
   a first read/write memory to store display data representing an image from a processor;
   a display module comprising:
      a matrix display device;
      a second read/write memory;
   a timing signal generator to generate a write control signal and a read control signal at an offset timing within one scanning cycle, wherein said write control signal is generated only after the image represented by the display data stored in said first read/write memory has been changed in accordance with the processor;
   a read/write controller which reads the display data stored in said first read/write memory in response to the read control signal, changes the format of the display data read out from said first read/write memory and transfers the display data to said second read/write memory in response to the write control signal,
      wherein said second read/write memory stores at least a portion of the display data read from said first read/write memory; and
   a display drive circuit for displaying an image on said matrix display device in accordance with the display data read from said second read/write memory,
   wherein said read/write controller reads the display data from said first read/write memory at a data transfer rate different than a data transfer rate of the display data read out from said second read/write memory by said display drive circuit, and
      wherein the amount of data transferred from said first read/write memory to said second read/write memory is less than the amount required for said display drive circuit to display said image on said matrix display device.

7. The display system of claim 6, wherein said timing signal generator further comprises:
   a clock detector to detect when a high frequency clock signal used for transferring the display data from said first read/write memory to said second read/write memory stops, said high frequency clock signal being generated only when the display data stored in said first read/write memory is changed; and
   a write prohibit controller to prohibit generation of the write control signal when said clock detector detects the stopping of the high frequency clock signal.

8. The display system of claim 7, wherein said read/write controller further comprises:
   a temporary memory to sequentially store the display data corresponding to at least one scan line of the matrix display device transferred from said first read/write memory in response to the high frequency clock signal; and
   a buffer to write to said second read/write memory the display data stored in said temporary memory within a period longer than one cycle of the high frequency clock signal.

9. The display system of claim 6, wherein said matrix display device comprises a liquid crystal display.

10. The display system of claim 6, wherein said display drive circuit comprises a plurality of display drivers.

11. The display system of claim 6, wherein said matrix display device comprises a plurality of display elements arranged in a matrix.

12. The display system of claim 6, wherein said matrix display device comprises a plurality of scanning electrodes and a plurality of signal electrodes arranged in a matrix.

13. A display system for displaying an image in accordance with display data, said display system comprising:
   a first read/write memory to store the display data;
   a processor to control and change the display data stored in said first read/write memory;
   a display module comprising:
      a matrix display device comprising a plurality of display elements arranged in a matrix; and
      a second read/write memory;
   a read/write controller which reads the display data stored in said first read/write memory, changes the format of the display data read out from said first read/write memory and transfers the display data to said second read/write memory,
      wherein said second read/write memory stores at least a portion of the display data read from said first read/write memory; and
   a display drive circuit for displaying the image on said matrix display device in accordance with the display data read from said second read/write memory,
      wherein said read/write controller reads the display data from said first read/write memory at a data transfer rate different than a data transfer rate of the display data read out from said second read/write memory by said display drive circuit, and
      wherein the amount of data transferred from said first read/write memory to said second read/write memory is less than the amount required for said display drive circuit to display said image on said matrix display device.

14. The display system of claim 13, wherein said matrix display device comprises a liquid crystal display.

15. The display system of claim 13, wherein said display drive circuit comprises a plurality of display drivers.

16. The display system of claim 13, wherein said matrix display device comprises a plurality of display elements arranged in a matrix.

17. The display system of claim 13, wherein said matrix display device comprises a plurality of scanning electrodes and a plurality of signal electrodes arranged in a matrix.

18. A display system for displaying an image in accordance with display data, said display system comprising:
   a first read/write memory to store display data;
   a processor to control and change the display data stored in said first read/write memory;
   a display module comprising:
      a matrix display device comprising a plurality of display elements arranged in a matrix;
      a second read/write memory; and
   a timing signal generator to generate a write control signal and a read control signal at an offset timing within one scanning cycle, wherein said write control signal is generated only after the image represented by the display data stored in said first read/write memory has been changed in accordance with the processor;
   a read/write controller which reads the display data stored in said first read/write memory in response to the read control signal, changes the format of the display data read out from said first read/write memory and transfers the display data to said second read/write memory in response to the write control signal, wherein said second read/write memory stores at least a portion of the display data read from said first read/write memory; and a display drive circuit for displaying an image on said matrix display device in accordance with the display data read from said second read/write memory, wherein said read/write controller reads the display data from said first read/write memory at a data transfer rate different than a data transfer rate of the display data read out from said second read/write memory by said display drive circuit, and wherein the amount of data transferred from said first read/write memory to said second read/write memory is less than the amount required for said display drive circuit to display said image on said matrix display device.

19. The display system of claim 18, wherein said timing signal generator further comprises:

a clock detector to detect when a high frequency clock signal used for transferring the display data from said first read/write memory to said second read/write memory stops, said high frequency clock signal being generated only when the display data stored in said first read/write memory is changed; and a write prohibit controller to prohibit generation of the write control signal when said clock detector detects the stopping of the high frequency clock signal.

20. The display system of claim 19, wherein said read/write controller further comprises:

a temporary memory to sequentially store the display data corresponding to at least one scan line of the matrix display device transferred from said first read/write memory in response to the high frequency clock signal; and a buffer to write to said second read/write memory the display data stored in said temporary memory within a period longer than one cycle of the high frequency clock signal.

21. The display system of claim 19, wherein said matrix display device comprises a liquid crystal display.

22. The display system of claim 19, wherein said display drive circuit comprises a plurality of display drivers.

23. The display system of claim 19, wherein said matrix display device comprises a plurality of display elements arranged in a matrix.

24. The display system of claim 19, wherein said matrix display device comprises a plurality of scanning electrodes and a plurality of signal electrodes arranged in a matrix.

25. A display system comprising:

a first read/write memory to store display data from a processor, wherein the display data includes first display data which has been changed by the processor and second display data which has not been changed by the processor;

a display module comprising:
a matrix display device; and
a second read/write memory;

a read/write controller which reads the first display data stored in said first read/write memory, changes the format of the first display data read out from said first read/write memory and transfers the first display data to said second read/write memory; and a display drive circuit for displaying an image on said matrix display device in accordance with the display data read from said second read/write memory, wherein said read/write controller reads the display data from said first read/write memory at a data transfer rate different than a data transfer rate of the display data read out from said second read/write memory by said display drive circuit, and wherein the amount of data transferred from said first read/write memory to said second read/write memory is less than the amount required for said display drive circuit to display said image on said matrix display device.

26. The display system of claim 25, wherein said matrix display device comprises a liquid crystal display.

27. The display system of claim 25, wherein said display drive circuit comprises a plurality of display drivers.

28. The display system of claim 25, wherein said matrix display device comprises a plurality of display elements arranged in a matrix.

29. The display system of claim 25, wherein said matrix display device comprises a plurality of scanning electrodes and a plurality of signal electrodes arranged in a matrix.

30. A display system comprising:

a first read/write memory to store display data representing an image from a processor;

a display module comprising:
a matrix display device; and
a second read/write memory;

an intermittent high frequency clock generator to generate a high frequency clock signal at an output terminal;

a controller (1) to activate said intermittent high frequency oscillator for generating the high frequency clock signal when the image represented by the display data stored in said first memory is changed in accordance with the processor and (2) to deactivate said intermittent high frequency generator so as not to generate the high frequency clock signal at the output terminal when the image represented by the display data stored in said first memory is not changed in accordance with the processor;

a read/write controller which reads the display data stored in said first read/write memory, changes the format of the display data read out from said first read/write memory and transfers the display data to said second read/write memory in response to the high frequency clock signal when said intermittent high frequency clock generator generates the high frequency clock signal, wherein said second read/write memory stores at least a portion of the display data read from said first read/write memory; and a display drive circuit for displaying the image on said matrix display device in accordance with the display data read from said second read/write memory, wherein said read/write controller reads the display data from said first read/write memory at a data transfer rate different than a data transfer rate of the display data read out from said second read/write memory by said display drive circuit, and wherein the amount of data transferred from said first read/write memory to said second read/write memory is less than the amount required for said display drive circuit to display said image on said matrix display device.

31. The display system of claim 30, wherein said matrix display device comprises a liquid crystal display.

32. The display system of claim 30, wherein said display drive circuit comprises a plurality of display drivers.

33. The display system of claim 30, wherein said matrix display device comprises a plurality of display elements arranged in a matrix.

34. The display system of claim 30, wherein said matrix display device comprises a plurality of scanning electrodes and a plurality of signal electrodes arranged in a matrix.

35. The display system of claim 30, wherein said intermittent high frequency clock generator comprises a CR oscillator.

36. The display system of claim 30, wherein said intermittent high frequency clock generator comprises a PLL.

37. A display system comprising:

a first read/write memory to store display data representing an image from a processor;

a low frequency clock generator to constantly generate a low frequency clock signal;

a display module comprising:
a matrix display device; and
a second read/write memory;

a display data update detector to (1) generate an activating control signal when the image represented by the display data stored in said first memory is changed in accordance with the processor and (2) generate a deactivating signal when the image represented by the display data stored in said first memory is not changed in accordance with the processor;

an intermittent high frequency clock generator to generate a high frequency clock signal at an output terminal when the activating control signal is generated by said display data update detector, wherein said intermittent high frequency clock generator is deactivated so as not to generate the high frequency clock signal at the output terminal when the deactivating signal is generated by said display data update detector;

a read/write controller which reads the display data stored in said first read/write memory, changes the format of the display data read out from said first read/write memory and transfers the display data to said second read/write memory in response to said high frequency clock signal when said intermittent high frequency generator generates the high frequency clock signal, wherein said second read/write memory stores at least a portion of the display data read from said first read/write memory; and a display drive circuit for displaying an image on said matrix display device in accordance with the display data read from said second read/write memory and in response to said low frequency clock signal, wherein said read/write controller reads the display data from said first read/write memory at a data transfer rate different than a data transfer rate of the display data read out from said second read/write memory by said display drive circuit, and wherein the amount of data transferred from said first read/write memory to said second read/write memory is less than the amount required for said display drive circuit to display said image on said matrix display device.

38. The display system of claim 37, wherein said matrix display device comprises a liquid crystal display.

39. The display system of claim 37, wherein said display drive circuit comprises a plurality of display drivers.

40. The display system of claim 37, wherein said matrix display device comprises a plurality of display elements arranged in a matrix.

41. The display system of claim 37, wherein said matrix display device comprises a plurality of scanning electrodes and a plurality of signal electrodes arranged in a matrix.

42. The display system of claim 37, wherein said intermittent high frequency clock generator comprises a CR oscillator.

43. The display system of claim 37, wherein said intermittent high frequency clock generator comprises a PLL.

* * * * *